United States Patent
Xie et al.

(10) Patent No.: US 12,335,151 B2
(45) Date of Patent: Jun. 17, 2025

(54) LOAD SHARING METHOD, ROOT NODE DEVICE, LEAF NODE DEVICE, AND SYSTEM

(71) Applicant: Huawei Technologies Co., Ltd., Shenzhen (CN)

(72) Inventors: Jingrong Xie, Beijing (CN); Fanghong Duan, Nanjing (CN); Shuying Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 48 days.

(21) Appl. No.: 18/337,940

(22) Filed: Jun. 20, 2023

(65) Prior Publication Data

US 2023/0336484 A1    Oct. 19, 2023

Related U.S. Application Data

(63) Continuation of application No. PCT/CN2021/137653, filed on Dec. 14, 2021.

(30) Foreign Application Priority Data

Dec. 21, 2020 (CN) .......................... 202011519565.2
Jan. 27, 2021 (CN) .......................... 202110108665.4

(51) Int. Cl.
*H04L 47/125* (2022.01)

(52) U.S. Cl.
CPC ................................. *H04L 47/125* (2013.01)

(58) Field of Classification Search
None
See application file for complete search history.

(56) References Cited

U.S. PATENT DOCUMENTS 8,953,446 B1    2/2015 Wang et al.
8,958,286 B1 *  2/2015 Atlas ........................ H04L 12/18
                                                              370/227

(Continued)

FOREIGN PATENT DOCUMENTS

JP    2006191635 A    7/2006
JP    2011023876 A    2/2011

OTHER PUBLICATIONS

Morin, T. ED. et al., "Multicast VPN Fast Upstream Failover," draft-ietf-bess-mvpn-fast-failover-13, Nov. 15, 2020, total 20 pages.

(Continued)

*Primary Examiner* — Ranodhi Serrao
(74) *Attorney, Agent, or Firm* — Slater Matsil, LLP

(57) ABSTRACT

This application provides a load sharing method, a root node device, a leaf node device, and a system. The method includes: a first root node device receives a message sent by the leaf node device, where the message includes a first identifier and configuration information. The first identifier indicates the leaf node device. The configuration information indicates a configuration mode, requested by the leaf node device, of load sharing from a root node device group to the leaf node device. The root node device group includes the first root node device. The first root node device determines, based on the first identifier and the configuration information, a configuration result of the load sharing from the first root node device to the leaf node device.

17 Claims, 6 Drawing Sheets

(56) References Cited

U.S. PATENT DOCUMENTS

| | | | |
|---|---|---|---|
| 2009/0041035 A1* | 2/2009 | Matsuo | H04L 67/1021 370/400 |
| 2012/0113807 A1* | 5/2012 | Vasseur | H04L 47/726 370/230 |
| 2012/0117268 A1* | 5/2012 | Shaffer | H04W 40/28 709/238 |
| 2013/0010790 A1* | 1/2013 | Shao | H04L 12/185 370/390 |
| 2013/0121335 A1* | 5/2013 | Hui | H04L 12/18 370/390 |
| 2013/0322291 A1* | 12/2013 | Venkataraman | H04L 43/16 370/254 |
| 2015/0055652 A1* | 2/2015 | Yong | H04L 12/185 370/390 |
| 2015/0200810 A1* | 7/2015 | Vasseur | H04L 41/147 370/256 |
| 2017/0078188 A1* | 3/2017 | Allan | H04L 12/185 |
| 2017/0264538 A1* | 9/2017 | Zhang | H04L 45/58 |
| 2018/0287946 A1 | 10/2018 | Nagarajan et al. | |
| 2019/0036717 A1* | 1/2019 | Kebler | H04L 45/22 |
| 2023/0133944 A1* | 5/2023 | Zhang | H04L 45/14 370/390 |

OTHER PUBLICATIONS

Rosen, E. Ed., "Multicast in MPLS/BGP IP VPNs," Internet Engineering Task Force, Request for Comments: 6513, Feb. 2012, total 88 pages.

Rosen, E. Ed., "Wildcards in Multicast VPN Auto-Discovery Routes," Internet Engineering Task Force, Request for Comments: 6625, May 2012, total 17 pages.

Rosen, E. Ed., Multicast VPN Using Bit Index Explicit Replication (BIER), Internet Engineering Task Force, Request for Comments: 8556, Apr. 2018, total 17 pages.

* cited by examiner

LOAD SHARING METHOD, ROOT NODE DEVICE, LEAF NODE DEVICE, AND SYSTEM

CROSS-REFERENCE TO RELATED APPLICATIONS

This application is a continuation of International Application No. PCT/CN2021/137653, filed on Dec. 14, 2021, which claims priorities to Chinese Patent Application No. 202011519565.2, filed on Dec. 21, 2020, and Chinese Patent Application No. 202110108665.4, filed on Jan. 27, 2021. All of the aforementioned patent applications are hereby incorporated by reference in their entireties.

TECHNICAL FIELD

This application relates to the field of network communication, and more specifically, to a load sharing method, a root node device, a leaf node device, and a system.

BACKGROUND

Multicast is a data transmission mode in which data is efficiently sent to a plurality of receivers in a transmission control protocol (TCP)/internet protocol (IP) network at a same time by using one multicast address.

A multicast application scenario includes a plurality of root node devices. In a related technical solution, one of the plurality of root node devices serves as an active device and is responsible for sending multicast traffic to a leaf node device. Another device other than the active device serves as a standby device of the leaf node device. When the active device works properly, the another standby device does not send multicast traffic to the leaf node device. In the related technical solution, the active device in the plurality of root node devices may be faulty due to a heavy load.

SUMMARY

This application provides a load sharing method, a first root node device, a leaf node device, and a load sharing system, so as to implement load sharing of multicast traffic.

According to a first aspect, a load sharing method is provided, where the method is applied to a communication network. The communication network includes a multicast source device, a root node device group, and a leaf node device. The multicast source device is configured to send multicast traffic to the leaf node device via the root node device group. The root node device group includes at least two root node devices. The method includes a first root node device that receives a message sent by the leaf node device, where the message includes a first identifier and configuration information. The first identifier indicates the leaf node device. The configuration information indicates a configuration mode, requested by the leaf node device, for load sharing from the root node device group to the leaf node device. The root node device group includes the first root node device. The first root node device determines, based on the first identifier and the configuration information, that a configuration result of the load sharing from the first root node device to the leaf node device. In response to the configuration result being a first result, the first root node device determines that the first root node device is a primary root of the leaf node device, where the primary root indicates that the first root node device is a designated forwarder DF that forwards the multicast traffic to the leaf node device.

Alternatively, in response to the configuration result being a second result, the first root node device determines that the first root node device is a secondary root of the leaf node device, where the secondary root indicates that the first root node device is a non-designated forwarder non-DF that forwards the multicast traffic to the leaf node device.

With reference to the first aspect, in some implementations of the first aspect, the configuration information includes first indication information, and the first indication information indicates that the first root node device is the primary root of the leaf node device.

With reference to the first aspect, in some implementations of the first aspect, the configuration information includes second indication information, and the second indication information indicates that the first root node device is the secondary root of the leaf node device.

With reference to the first aspect, in some implementation of the first aspect, the configuration information includes third indication information, and the third indication information indicates information about a candidate root node device serving as the primary root of the leaf node device.

With reference to the first aspect, in some implementations of the first aspect, the candidate root node device includes the first root node device, and the first root node device performs hash calculation on the first identifier and the configuration information, to obtain the configuration result.

With reference to the first aspect, in some implementations of the first aspect, the message further includes a multicast source group, the candidate root node device includes the first root node device, and the first root node device performs hash calculation on the multicast source group, the first identifier, and the configuration information, to obtain the configuration result.

With reference to the first aspect, in some implementations of the first aspect, the method further includes: The first root node device receives the multicast traffic. In response to the first root node device being the primary root of the leaf node device, the first root node device sends the multicast traffic to the leaf node device.

With reference to the first aspect, in some implementations of the first aspect, the communication network is a multicast virtual private network MVPN.

According to a second aspect, a load sharing method is provided, where the method is applied to a communication network, the communication network includes a multicast source device, a root node device group, and a leaf node device. The multicast source device is configured to send multicast traffic to the leaf node device via the root node device group. The root node device group includes at least two root node devices. The leaf node device generates a message, where the message includes a first identifier and configuration information. The first identifier indicates the leaf node device. The configuration information indicates a configuration mode, requested by the leaf node device, of load sharing from the root node device group to the leaf node device. The leaf node device sends the message to a first root node device. The root node device group includes the first root node device.

With reference to the second aspect, in some implementations of the second aspect, the configuration information includes first indication information, the first indication information indicates that the first root node device is a primary root of the leaf node device, and the primary root indicates that the first root node device is a designated forwarder DF that forwards the multicast traffic to the leaf node device.

With reference to the second aspect, in some implementations of the second aspect, the configuration information includes second indication information, the second indication information indicates that the first root node device is a secondary root of the leaf node device, and the secondary root indicates that the first root node device is a non-designated forwarder non-DF that forwards the multicast traffic to the leaf node device.

With reference to the second aspect, in some implementations of the second aspect, the configuration information includes third indication information, and the third indication information indicates information about a candidate root node device serving as the primary root of the leaf node device.

With reference to the second aspect, in some implementations of the second aspect, the first root node device is the primary root of the leaf node device. The method further includes: The leaf node device receives the multicast traffic sent by the first root node device.

With reference to the second aspect, in some implementations of the second aspect, the communication network is a multicast virtual private network MVPN.

According to a third aspect, a load sharing method is provided, where the method is applied to a communication network. The communication network includes a multicast source device, a root node device group, a first leaf node device, and a second leaf node device. The multicast source device is configured to send multicast traffic to the first leaf node device and the second leaf node device via the root node device group. The root node device group includes a first root node device and a second root node device. The first root node device receives the multicast traffic, where the root node device group includes the first root node device. In response to the first root node device being a primary root of the first leaf node device, the first root node device sends the multicast traffic to the first leaf node device. The first root node device being the primary root of the first leaf node device indicates that the first root node device is a designated forwarder DF that forwards the multicast traffic to the first leaf node device. The second root node device receives the multicast traffic, where the root node device group includes the second root node device. In response to the second root node device being a primary root of the second leaf node device, the second root node device sends the multicast traffic to the second leaf node device. The second root node device being the primary root of the second leaf node device indicates that the second root node device is a designated forwarder DF that forwards the multicast traffic to the second leaf node device.

With reference to the third aspect, in some implementations of the third aspect, the method further includes: The first root node device receives a first message sent by the first leaf node device, where the first message includes a first identifier and first configuration information. The first identifier indicates the first leaf node device. The first configuration information indicates a configuration mode, requested by the first leaf node device, for load sharing from the root node device group to the first leaf node device. The first root node determines a configuration result of first load sharing from the first root node device to the first leaf node device based on the first identifier and the first configuration information. In response to the configuration result of the first load sharing being a first result, the first root node device determines that the first root node device is the primary root of the first leaf node device.

With reference to the third aspect, in some implementations of the third aspect, the configuration information includes first indication information, and the first indication information indicates that the first root node device is the primary root of the first leaf node device.

With reference to the third aspect, in some implementations of the third aspect, the first configuration information includes second indication information, and the second indication information indicates information about a first candidate root node device serving as the primary root of the first leaf node device.

With reference to the third aspect, in some implementations of the third aspect, the first candidate root node device includes the first root node device, and the first root node device performs hash calculation on the first identifier and the first configuration information, to obtain the configuration result of the first load sharing.

With reference to the third aspect, in some implementations of the third aspect, the first message further includes a multicast source group (S, G), the first candidate root node device includes the first root node device, and the first root node device performs hash calculation on the multicast source group (S, G), the first identifier, and the configuration information, to obtain the configuration result of the first load sharing.

With reference to the third aspect, in some implementations of the third aspect, the method further includes: The second root node device receives a second message sent by the second leaf node device, where the second message includes a second identifier and second configuration information. The second identifier indicates the second leaf node device. The second configuration information indicates a configuration mode, requested by the second leaf node device, of load sharing from the root node device group to the second leaf node device. The second root node device determines a configuration result of second load sharing from the second root node device to the second leaf node device based on the second identifier and the second configuration information. In response to the configuration result of the second load sharing being a second result, the second root node device determines that the second root node device is the primary root of the second leaf node device.

With reference to the third aspect, in some implementations of the third aspect, the second configuration information includes third indication information, and the third indication information indicates that the second root node device is the primary root of the second leaf node device.

With reference to the third aspect, in some implementations of the third aspect, the second configuration information includes fourth indication information, and the fourth indication information indicates information about a second candidate root node device serving as the primary root of the second leaf node device.

With reference to the third aspect, in some implementations of the third aspect, the second candidate root node device includes the second root node device, and the second root node device performs hash calculation on the second identifier and the second configuration information, to obtain the configuration result of the second load sharing.

With reference to the third aspect, in some implementations of the third aspect, the second message further includes a multicast source group (S, G), the second candidate root node device includes the second root node device, and the second root node device performs hash calculation on the multicast source group (S, G), the second identifier, and the second configuration information, to obtain the configuration result of the second load sharing.

With reference to the third aspect, in some implementations of the third aspect, the communication network is a multicast virtual private network MVPN.

According to a fourth aspect, a first root node device is provided, where the first root node device is applied to a communication network. The communication network includes a multicast source device, a root node device group, and a leaf node device. The multicast source device is configured to send multicast traffic to the leaf node device via the root node device group. The root node device group includes at least two root node devices including the first root node device. The first root node device includes: a receiving module, configured to receive a message sent by the leaf node device, where the message includes a first identifier and configuration information, the first identifier indicates the leaf node device, the configuration information indicates a configuration mode, requested by the leaf node device, of load sharing from the root node device group to the leaf node device, and the root node device group includes the first root node device; and a determining module, configured to determine a configuration result of the load sharing from the first root node device to the leaf node device based on the first identifier and the configuration information, where the determining module is further configured to: in response to the configuration result being a first result, determine that the first root node device is a primary root of the leaf node device, where the primary root indicates that the first root node device is a designated forwarder DF that forwards the multicast traffic to the leaf node device; or the determining module is further configured to: in response to the configuration result being a second result, determine that the first root node device is a secondary root of the leaf node device, where the secondary root indicates that the first root node device is a non-designated forwarder non-DF that forwards the multicast traffic to the leaf node device.

With reference to the fourth aspect, in some implementations of the fourth aspect, the configuration information includes first indication information, and the first indication information indicates that the first root node device is the primary root of the leaf node device.

With reference to the fourth aspect, in some implementations of the fourth aspect, the configuration information includes second indication information, and the second indication information indicates that the first root node device is the secondary root of the leaf node device.

With reference to the fourth aspect, in some implementations of the fourth aspect, the configuration information includes third indication information, and the third indication information indicates information about a candidate root node device serving as the primary root of the leaf node device.

With reference to the fourth aspect, in some implementations of the fourth aspect, the candidate root node device includes the first root node device, and the determining module is further configured to perform hash calculation on the first identifier and the configuration information, to obtain the configuration result.

With reference to the fourth aspect, in some implementations of the fourth aspect, the message further includes a multicast source group (S, G), and the candidate root node device includes the first root node device; and the determining module is further configured to perform hash calculation on the multicast source group (S, G), the first identifier, and the configuration information, to obtain the configuration result.

With reference to the fourth aspect, in some implementations of the fourth aspect, the receiving module is configured to receive the multicast traffic; and the first root node device further includes: a sending module, configured to send the multicast traffic to the leaf node device in response to the first root node device being the primary root of the leaf node device.

With reference to the fourth aspect, in some implementations of the fourth aspect, the communication network is a multicast virtual private network MVPN.

According to a fifth aspect, a leaf node device is provided, where the leaf node device is applied to a communication network. The communication network includes a multicast source device, a root node device group, and the leaf node device. The multicast source device is configured to send multicast traffic to the leaf node device via the root node device group. The root node device group includes at least two root node devices. The leaf node device includes: a generation module, configured to generate a message, where the message includes a first identifier and configuration information, the first identifier indicates the leaf node device, and the configuration information indicates a configuration mode, requested by the leaf node device, of load sharing from the root node device group to the leaf node device; and a sending module, configured to send the message to a first root node device, where the root node device group includes the first root node device. With reference to the fifth aspect, in some implementations of the fifth aspect, the configuration information includes first indication information, where the first indication information indicates that the first root node device is a primary root of the leaf node device, and the primary root indicates that the first root node device is a designated forwarder DF that forwards the multicast traffic to the leaf node device.

With reference to the fifth aspect, in some implementations of the fifth aspect, the configuration information includes second indication information, where the second indication information indicates that the first root node device is a secondary root of the leaf node device, and the secondary root indicates that the first root node device is a non-designated forwarder non-DF that forwards the multicast traffic to the leaf node device.

With reference to the fifth aspect, in some implementations of the fifth aspect, the configuration information includes third indication information, and the third indication information indicates information about a candidate root node device serving as the primary root of the leaf node device.

With reference to the fifth aspect, in some implementations of the fifth aspect, the first root node device is the primary root of the leaf node device, and the leaf node device further includes a receiving module, configured to receive the multicast traffic sent by the first root node device.

With reference to the fifth aspect, in some implementations of the fourth aspect, the communication network is a multicast virtual private network MVPN.

According to a sixth aspect, a load sharing system is provided, where the system is applied to a communication network. The communication network includes a multicast source device, a root node device group, a first leaf node device, and a second leaf node device. The multicast source device is configured to send multicast traffic to the first leaf node device and the second leaf node device via the root node device group. The root node device group includes a first root node device and a second root node device. The system includes: a receiving module, configured to receive, by the first root node device, the multicast traffic, where the root node device group includes the first root node device; and a sending module, configured to: in response to the first root node device being a primary root of the first leaf node device, the first root node device sends the multicast traffic to the first leaf node device, where the first root node device being the primary root of the first leaf node device indicates that the first root node device is a designated forwarder DF that forwards the multicast traffic to the first leaf node device; the receiving module, further configured to receive, by the second root node device, the multicast traffic, where the root node device group includes the second root node device; the sending module is configured to: in response to the second root node device being a primary root of the second leaf node device, the second root node device sends the multicast traffic to the second leaf node device, where the second root node device being the primary root of the second leaf node device indicates that the second root node device is a designated forwarder DF that forwards the multicast traffic to the second leaf node device.

With reference to the sixth aspect, in some implementations of the sixth aspect, the determining module is further configured to receive, by the first root node device, a first message sent by the first leaf node device, where the first message includes a first identifier and first configuration information, the first identifier indicates the first leaf node device, and the first configuration information indicates a configuration mode, requested by the first leaf node, of load sharing from the root node device group to the first leaf node device. The system further includes: a determining module, configured to determine, by the first root node, a configuration result of first load sharing from the first root node device to the first leaf node device based on the first identifier and the first configuration information; and the determining module is further configured to: in response to the configuration result of the first load sharing being a first result, the first root node device determines that the first root node device is the primary root of the first leaf node device.

With reference to the sixth aspect, in some implementations of the sixth aspect, the configuration information includes first indication information, and the first indication information indicates that the first root node device is the primary root of the first leaf node device.

With reference to the sixth aspect, in some implementations of the sixth aspect, the first configuration information includes second indication information, and the second indication information indicates information about a first candidate root node device serving as the primary root of the first leaf node device.

With reference to the sixth aspect, in some implementations of the sixth aspect, the first candidate root node device includes the first root node device, and the determining module is further configured to perform hash calculation on the first identifier and the first configuration information, to obtain the configuration result of the first load sharing.

With reference to the sixth aspect, in some implementations of the sixth aspect, the first message further includes a multicast source group (S, G), the first candidate root node device includes the first root node device, and the determining module is further configured to perform hash calculation on the multicast source group (S, G), the first identifier, and the first configuration information, to obtain the configuration result of the first load sharing.

With reference to the sixth aspect, in some implementations of the sixth aspect, the receiving module is further configured to receive, by the second root node device, a second message sent by the second leaf node device, where the second message includes a second identifier and second configuration information. The second identifier indicates the second leaf node device. The second configuration information indicates a configuration mode, requested by the second leaf node device, of load sharing from the root node device group to the second leaf node device. The determining module is further configured to determine, by the second root node device, a configuration result of second load sharing from the second root node device to the second leaf node device based on the second identifier and the second configuration information. The determining module is further configured to determine, by the second root node device, that the second root node device is the primary root of the second leaf node device in response to the configuration result of the second load sharing being a second result.

With reference to the sixth aspect, in some implementations of the sixth aspect, the second configuration information includes third indication information, and the third indication information indicates that the second root node device is the primary root of the second leaf node device.

With reference to the sixth aspect, in some implementations of the sixth aspect, the second configuration information includes fourth indication information, and the fourth indication information indicates information about a second candidate root node device serving as the primary root of the second leaf node device.

With reference to the sixth aspect, in some implementations of the sixth aspect, the second candidate root node device includes the second root node device, and the determining module is further configured for the second root node device to perform hash calculation on the second identifier and the second configuration information, to obtain the configuration result of the second load sharing.

With reference to the sixth aspect, in some implementations of the sixth aspect, the second message further includes a multicast source group (S, G), the second candidate root node device includes the second root node device, and the determining module is further configured to perform hash calculation on the multicast source group (S, G), the second identifier, and the second configuration information, to obtain the configuration result of the second load sharing.

With reference to the sixth aspect, in some implementations of the sixth aspect, the communication network is a multicast virtual private network MVPN.

According to a seventh aspect, a first root node device is provided. The first root node device has a function of implementing behavior of the first root node device in the foregoing method. The function may be implemented based on hardware, or may be implemented based on hardware executing corresponding software. The hardware or software includes one or more modules corresponding to the foregoing functions.

In a possible design, a structure of the first root node device includes a processor and an interface. The processor is configured to support the first root node device in performing a corresponding function in the foregoing method. The interface is configured to support the first root node device in receiving a message sent by the leaf node device.

The first root node device may further include a memory. The memory is configured to be coupled to the processor, and the memory stores program instructions and data that are necessary for the first root node device.

In another possible design, the first root node device includes a processor, a transmitter, a receiver, a random access memory, a read-only memory, and a bus. The processor is coupled to the transmitter, the receiver, the random access memory, and the read-only memory through the bus. When the first root node device needs to be run, a basic input/output system built into the read-only memory or a bootloader in an embedded system is used to boot a system to start, and boot the first root node device to enter a normal operating status. After entering the normal operating status, the first root node device runs an application program and an operating system in the random access memory, so that the processor performs the method according to the first aspect or any one of the possible implementations of the first aspect.

According to an eighth aspect, a first root node device is provided. The first root node device includes a main control board and an interface board, and may further include a switching board. The first root node device is configured to perform the method according to the first aspect or any one of the possible implementations of the first aspect. Specifically, the first root node device includes a module configured to perform the method according to the first aspect or any one of the possible implementations of the first aspect.

According to a ninth aspect, a first root node device is provided. The first root node device includes a control module and a first forwarding sub-device. The first forwarding subdevice includes an interface board, and may further include a switching board. The first forwarding sub-device is configured to execute a function of the interface board in the eighth aspect, and may further execute a function of the switching board in the eighth aspect. The control module includes a receiver, a processor, a transmitter, a random access memory, a read-only memory, and a bus. The processor is coupled to the receiver, the transmitter, the random access memory, and the read-only memory through the bus. When the control module needs to be run, the control module is started by using a basic input/output system built into the read-only memory or a bootloader booting system in an embedded system, to boot the control module to enter a normal running state. After entering the normal operating status, the control module runs an application program and an operating system in the random access memory, so that the processor performs a function of the main control board in the eighth aspect.

It may be understood that the first root node device may include any quantity of interfaces, processors, or memories in an actual application.

According to a tenth aspect, a leaf node device is provided. The leaf node device has a function of implementing behavior of the leaf node device in the foregoing method. The function may be implemented based on hardware, or may be implemented based on hardware executing corresponding software. The hardware or software includes one or more modules corresponding to the foregoing functions.

In a possible design, a structure of the leaf node device includes a processor and an interface. The processor is configured to support the leaf node device in executing a corresponding function in the foregoing method. The interface is configured to support sending a message to the first root node device; or receive the multicast traffic sent by the first root node device.

The leaf node device may further include a memory. The memory is configured to be coupled to the processor, and the memory stores program instructions and data that are necessary for the leaf node device.

In another possible design, the leaf node device includes a processor, a transmitter, a receiver, a random access memory, a read-only memory, and a bus. The processor is coupled to the transmitter, the receiver, the random access memory, and the read-only memory through the bus. When the leaf node device needs to be run, a basic input/output system built into the read-only memory or a bootloader in an embedded system is used to boot a system to start, and boot the leaf node device to enter a normal operating status. After entering the normal operating status, the leaf node device runs an application program and an operating system in the random access memory, so that the processor performs the method according to the second aspect or any one of the possible implementations of the second aspect.

According to an eleventh aspect, a leaf node device is provided. The leaf node device includes a main control board and an interface board, and may further include a switching board. The leaf node device is configured to perform the method according to the second aspect or any one of the possible implementations of the second aspect. Specifically, the leaf node device includes a module configured to perform the method according to the second aspect or any one of the possible implementations of the second aspect.

According to a twelfth aspect, a leaf node device is provided. The leaf node device includes a control module and a first forwarding sub-device. The first forwarding subdevice includes an interface board, and may further include a switching board. The first forwarding sub-device is configured to perform a function of the interface board in the eleventh aspect, and may further perform a function of the switching board in the eleventh aspect. The control module includes a receiver, a processor, a transmitter, a random access memory, a read-only memory, and a bus. The processor is coupled to the receiver, the transmitter, the random access memory, and the read-only memory through the bus. When the control module needs to be run, the control module is started by using a basic input/output system built into the read-only memory or a bootloader booting system in an embedded system, to boot the control module to enter a normal running state. After entering the normal operating status, the control module runs an application program and an operating system in the random access memory, so that the processor performs a function of the main control board in the eleventh aspect.

It may be understood that the leaf node device may include any quantity of interfaces, processors, or memories in an actual application.

According to a thirteenth aspect, a computer program product is provided. The computer program product includes a computer program code. When the computer program code is executable on a computer, the computer is enabled to perform the method according to the first aspect or any one of the possible implementations of the first aspect.

According to a fourteenth aspect, a computer program product is provided. The computer program product includes a computer program code. When the computer program code is executable on a computer, the computer is enabled to perform the method according to the second aspect or any one of the possible implementations of the second aspect.

According to a fifteenth aspect, a computer-readable medium is provided. The computer-readable medium stores a program code. When the computer program code is executable on a computer, the computer is enabled to perform the method according to the first aspect or any one of the possible implementations of the first aspect. The computer-readable storage includes but is not limited to one or more of the following: a read-only memory (ROM), a programmable ROM (PROM), an erasable PROM (EPROM), a Flash memory, an electrically EPROM (EEPROM), and a hard drive.

According to a sixteenth aspect, a computer-readable medium is provided. The computer-readable medium stores a program code. When the computer program code is executable on a computer, the computer is enabled to perform the method according to the second aspect or any one of the possible implementations of the second aspect. The computer-readable storage includes but is not limited to one or more of the following: a read-only memory (ROM), a programmable ROM (PROM), an erasable PROM (EPROM), a Flash memory, an electrically EPROM (EEPROM), and a hard drive.

According to a seventeenth aspect, a chip is provided. The chip includes a processor and a data interface, where the processor reads, via the data interface, instructions stored in a memory, to perform the method according to the first aspect or any one of the possible implementations of the first aspect. In a specific implementation process, the chip may be implemented in a form of a central processing unit (CPU), a micro controller unit (MCU), a micro processing unit (MPU), a digital signal processor (DSP), a system on chip (SoC), an application-specific integrated circuit (ASIC), a field programmable gate array (FPGA), or a programmable logic device (PLD).

According to an eighteenth aspect, a chip is provided. The chip includes a processor and a data interface, where the processor reads, via the data interface, instructions stored in a memory, to perform the method according to the second aspect or any one of the possible implementations of the second aspect. In a specific implementation process, the chip may be implemented in a form of a central processing unit (CPU), a micro controller unit (MCU), a micro processing unit (MPU), a digital signal processor (DSP), a system on chip (SoC), an application-specific integrated circuit (ASIC), a field programmable gate array (FPGA), or a programmable logic device (PLD).

According to a nineteenth aspect, a system is provided. The system includes the first root node device and the leaf node device described above.

DETAILED DESCRIPTION OF ILLUSTRATIVE EMBODIMENTS

Figure 1:
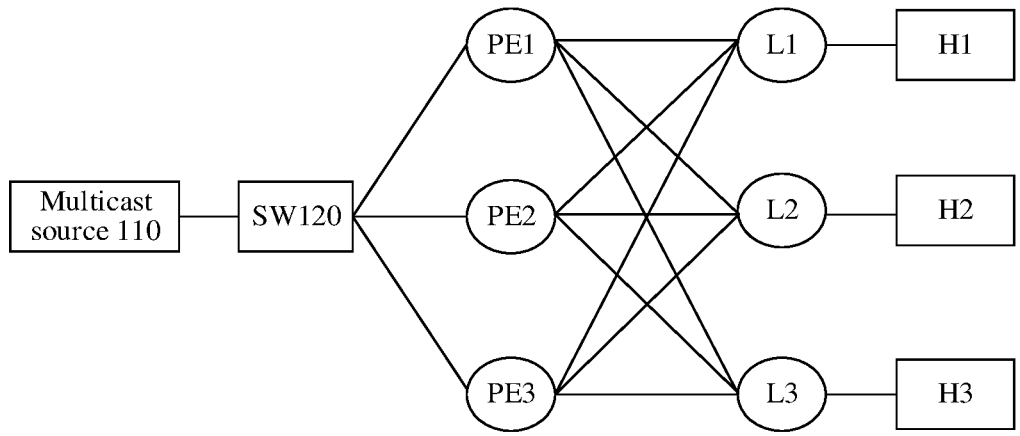
FIG. 1 is a schematic diagram of a multicast scenario applied to an embodiment of this application.

The following describes the technical solutions in this application with reference to the accompanying drawings.

All aspects, embodiments, or features are presented in this application based on a system that includes a plurality of devices, components, and modules. It should be appreciated and understood that, each system may include another device, component, module, and the like, and/or may not include all devices, components, modules, and the like discussed with reference to the accompanying drawings. In addition, a combination of these solutions may further be used.

In addition, in embodiments of this application, the terms such as "for example" and "such as" are used to represent giving an example, an illustration, or a description. Any embodiment or design scheme described as an "example" in this application should not be explained as being more preferred or having more advantages than another embodiment or design scheme. Exactly, the term "for example" is used to present a concept in a specific manner.

In embodiments of this application, "corresponding (corresponding, relevant)" and "corresponding" may be interchangeably used sometimes. It should be noted that meanings expressed by the terms are consistent when differences are not emphasized.

A network architecture and a service scenario described in embodiments of this application are intended to describe embodiments of this application more clearly, but constitute no limitation provided in embodiments of this application. A person of ordinary skill in the art may learn that the embodiments of this application are also applicable to a similar issues as the network architecture evolves and a new service scenario emerges.

Reference to "an embodiment", "some embodiments", or the like described in this specification indicates that one or more embodiments of this application include a specific feature, structure, or characteristic described with reference to the embodiment. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "have", and their variants all mean "include but are not limited to", unless otherwise specifically emphasized in another manner.

In this application, at least one means one or more, and a plurality of means two or more. The term "and/or" describes an association relationship between associated objects and represents that three relationships may exist. For example, A and/or B may represent the following three cases: Only A exists, both A and B exist, and only B exists. A and B may be in a singular or plural form. The character "/" generally indicates an "or" relationship between the associated objects. At least one of the following items (pieces) or a similar expression thereof refers to any combination of these items, including any combination of singular items (pieces) or plural items (pieces). For example, at least one of a, b, and c may mean: a, b, c, a-b, a-c, b-c, or a-b-c. The a, the b, and the c may be singular or several.

Multicast is a data transmission mode in which data is efficiently sent to a plurality of receivers in a transmission control protocol (TCP)/internet protocol (IP) network at a same time by using one multicast address. A multicast source sends multicast traffic to multicast group members in a multicast group through links in a network, and each multicast group member in the multicast group can receive the multicast traffic. In a multicast transmission mode, a point-to-multipoint data connection is implemented between the multicast source and the multicast group members. The multicast traffic needs to be transmitted only once on each network link, and multicast replication is performed only when there is a branch on the link. Therefore, in the multicast transmission mode, data transmission efficiency is improved and a possibility of congestion on a backbone network is reduced. IP multicast implements efficient point-to-multipoint data transmission in an IP network, effectively saving network bandwidth and reducing network loads. Therefore, the internet protocol multicast technology is widely used in a plurality of aspects such as real-time data transmission, a multimedia conference, data copying, interactive protocol television (IPTV), a game, and simulation.

With reference to FIG. 1, the following is a detailed description of a multicast scenario applied to an embodiment of this application. As shown in FIG. 1, the multicast scenario may include a multicast source no, a switch (SW) 120, a provider edge device (PE) 1/PE2/PE3, L1/L2/L3, and H1/H2/H3.

The multicast source 110 is configured to send multicast traffic. In one example, such as in an application scenario of global table multicast (GTM), Non-VPN Multicast, or internet multicast, one piece of multicast traffic may be represented by a multicast source group (S, G), where S represents an address of a multicast source, and G represents an address of a multicast group (G). In another example, in an application scenario of a multicast virtual private network (MVPN), a VPN instance or a virtual route forwarding (VRF) instance usually exists. Therefore, one piece of multicast traffic may also be represented via (VPN, S, G). For ease of description, the following uses an example in which (S, G) represents one multicast traffic for description.

H1/H2/H3 is a multicast receiver, and is configured to receive multicast traffic sent by the multicast source no. H1/H2/H3 may also be referred to as a user-side router or host device.

A network formed by PE1/PE2/PE3 and L1/L2/L3 belongs to a bearer network, and is responsible for forwarding a multicast stream sent by the multicast source 110 to H1/H2/H3. The bearer network may be, for example, a carrier network, a data center network, or a campus network. This is not specifically limited in this application. PE1/PE2/PE3 is an ingress device, and L1/L2/L3 is an egress PE device. PE1/PE2/PE3 may also be referred to as an ingress PE, a root node, or a Root PE. L1/L2/L3 may also be referred to as an egress PE, or a leaf node, or a leaf PE.

Optionally, one or more intermediate forwarding devices (not shown in FIG. 1) may be also included between PE1/PE2/PE3 and L1/L2/L3. This is not specifically limited in this application.

In a related technical solution, PE1 serves as a primary root of the leaf nodes (L1/L2/L3) or a primary upstream multicast hop (primary UMH), and is responsible for sending multicast traffic to each of the leaf nodes (L1/L2/L3). However, PE2 and PE3 serve as secondary roots. When PE1 is working properly, PE2 and PE3 are not responsible for sending multicast traffic to each of the leaf nodes (L1/L2/L3). They are only in a standby state. Similarly, if there are more leaf nodes (for example, 30 or 300 leaves), PE1 is also responsible for sending multicast traffic to all these leaves, and PE2 and PE3 are in the standby state. If PE1 fails or a link between PE1 and SW120 fails, either PE2 or PE3 takes over and is responsible for sending multicast traffic to each of the leaf nodes (L1/L2/L3). In the foregoing solution, when PE1 is working properly, a load of PE1 is heavy, but a load of PE2 and PE3 is light. In this case, PE1 is likely to be faulty due to a heavy load. In addition, even if PE1 is faulty, either PE2 or PE3 is responsible for sending multicast traffic to each of the leaf nodes. However, load distribution between PE2 and PE3 is unbalanced, and PE2 or PE3 responsible for sending multicast traffic may also be faulty due to the heavy load.

Figure 2:
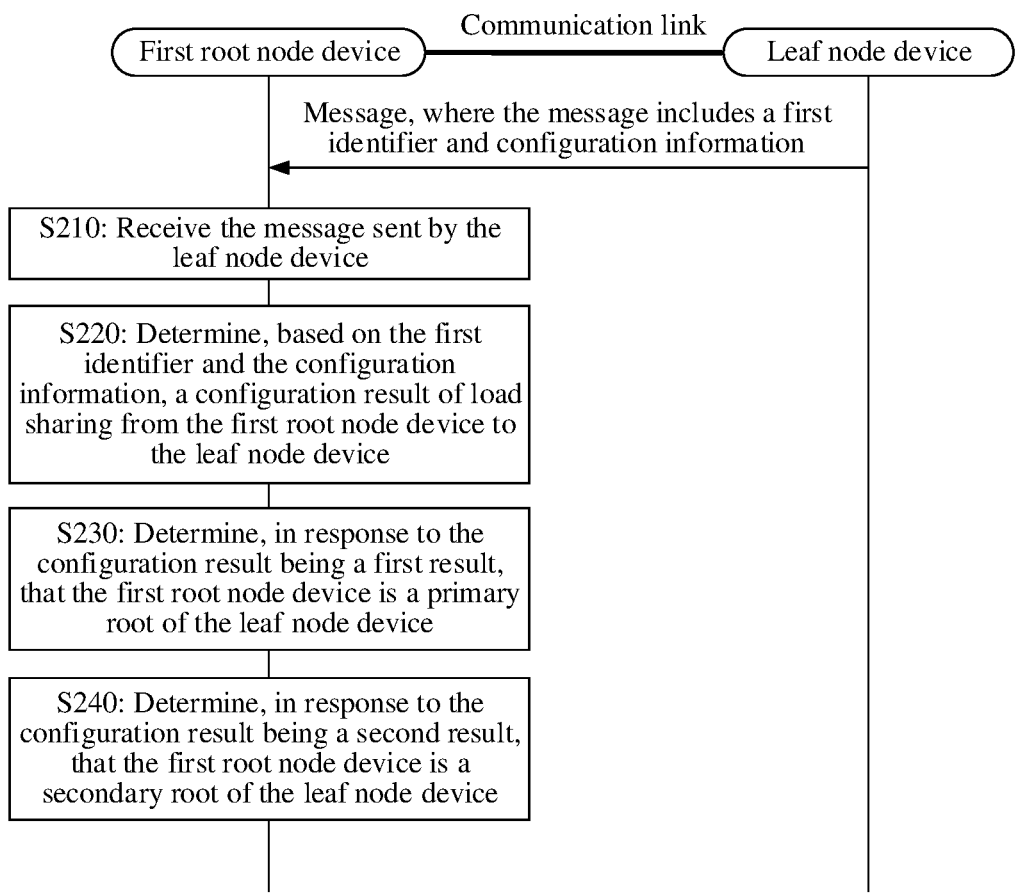
FIG. 2 is a schematic flowchart of a load sharing method according to an embodiment of this application.

In view of this, embodiments of this application provide a load sharing method, so that multicast traffic is shared among root nodes, to implement load balancing, thereby avoiding unbalanced load distribution among the root nodes. With reference to FIG. 2, the following is a detailed description of a load sharing method according to an embodiment of this application.

FIG. 2 is a schematic flowchart of a load sharing method according to an embodiment of this application. As shown in FIG. 2, the method may include steps 210 to 240. The following separately describes steps 210 to 240 in detail.

It should be understood that the method may be applied to a communication network, which may be referred to as a network to which a multicast technology is applied. For example, the method is applied to a virtual private network (VPN). Specifically, the method may be applied to a multicast virtual private network (MVPN). As an example, the communication network may include a multicast source device, a root node device group, and a leaf node device. The multicast source device is configured to send multicast traffic to the leaf node device via the root node device group. The root node device group includes at least two root node devices. The network may include one leaf node device, or may include a plurality of leaf node devices. This is not specifically limited in this application. If the network includes one leaf node device, the leaf node device is connected to at least two root node devices included in the root node device group. If the network includes a plurality of leaf node devices, the plurality of leaf node devices are fully connected to the at least two root node devices included in the root node device group.

For example, the method may be applied to the multicast scenario shown in FIG. 1. In the multicast scenario, the multicast source no may be the multicast source device described above. PE1/PE2/PE3 may be the root node device described above, and PE1, PE2, and PE3 form a root node device group. L1/L2/L3 may be the leaf node device described above. For ease of description, an example in which three leaf node devices (L1, L2, and L3) are included is used in FIG. 1 for description.

Step 210: A first root node device receives a message sent by a leaf node device, where the message includes a first identifier and configuration information.

A root node device group includes at least two root node devices, and the first root node device may be one device in the root node device group. The first root node device may receive the message sent by the leaf node device, where the message includes the first identifier and the configuration information. The first identifier indicates the leaf node device. For example, the first identifier may be an IP address of the leaf node device. For another example, the first identifier may also be a bit forwarding router identifier (BFR ID) of the leaf node device. The configuration information described above may be used to indicate a configuration mode, requested by the leaf node device, of load sharing from the root node device group to the leaf node device. Specifically, there are a plurality of implementations in which the configuration information indicates a configuration mode of load sharing from the root node device group to the leaf node device. This is not specifically limited in this application. The following is a detailed description of several possible implementations.

As an example, in an implementation, the configuration information may include first indication information, and the first indication information indicates that the first root node device is a primary root of the leaf node device. The first root node device being a primary root of the leaf node device may be understood as that the first root node device is a designated forwarder (DF) that forwards the multicast traffic to the leaf node device. Alternatively, the configuration information may include second indication information, and the second indication information indicates that the first root node device is a secondary root of the leaf node device. The first root node device being a secondary root of the leaf node device may be understood as that the first root node device is a non-designated forwarder (non-DF) that forwards the multicast traffic to the leaf node device.

As an example, in another implementation, the configuration information may include third indication information, where the third indication information indicates information about a candidate root node device serving as the primary root of the leaf node device, and the candidate root node device determines that the candidate root node device serves as the primary root of the leaf node device. In other words, the third indication information indicates a load sharing group that serves as the primary root of the leaf node device, the load sharing group includes a plurality of candidate root node devices, and the plurality of root node devices in the load sharing group determine that each of the root node devices serves as a device of the primary root of the leaf node device.

Optionally, the configuration information may further include fourth indication information, where the fourth indication information indicates information about a candidate root node device serving as the secondary root of the leaf node device, and the candidate root node device determines that the candidate root node device serves as the secondary root of the leaf node device. In other words, the third indication information indicates a load sharing group that serves as the secondary root of the leaf node device, the load sharing group includes a plurality of candidate root node devices, and the plurality of root node devices in the load sharing group determine that each of the root node devices serves as a device of the secondary root of the leaf node device.

Step 220: The first root node device determines a configuration result of the load sharing from the first root node device to the leaf node device based on the first identifier and the configuration information.

After receiving the first identifier and the configuration information that are sent by the leaf node device, the first root node device may determine, based on the first identifier and the configuration information, a configuration result of the load sharing from the first root node device to the leaf node device. In an example, if the configuration information includes the first indication information described above, the first root node device may directly determine, based on the first indication information, that the configuration result is a first result. Alternatively, if the configuration information includes the second indication information described above, the first root node device may directly determine, based on the second indication information, that the configuration result is a second result. In another example, if the configuration information includes the third indication information, and the first root node device serves as a candidate root node device of a primary root of the leaf node device, hash calculation may be performed on the first identifier and the configuration information (for example, information about the candidate root node device that is indicated by the third indication information and that serves as the primary root of the leaf node device), to obtain the first result. Alternatively, if the configuration information includes the fourth indication information described above, and the first root node device serves as a candidate root node device of a secondary root of the leaf node device, hash calculation may be performed on the first identifier and the configuration information (for example, information about the candidate root node device that is indicated by the fourth indication information and that serves as the secondary root of the leaf node device), to obtain the second result. In yet another example, if the configuration information includes the third indication information described above, the message sent by the leaf node device to the first root node device further includes a multicast source group (S, G), and the first root node device serves as a candidate root node device of a primary root of the leaf node device, hash calculation may be performed on the multicast source group (S, G), the first identifier, and the configuration information (for example, information about the candidate root node device that is indicated by the third indication information and that serves as the primary root of the leaf node device), to obtain the first result. Alternatively, if the configuration information includes the fourth indication information, and the first root node device serves as a candidate root node device of a secondary root of the leaf node device, hash calculation may be performed on the multicast source group (S, G), the first identifier, and the configuration information (for example, information about the candidate root node device that is indicated by the fourth indication information and that serves as the secondary root of the leaf node device), to obtain the second result.

The first root node device may determine, based on whether the configuration result of the load sharing described above is the first result or the second result, whether the first root node device serves as the primary root or the secondary root of the leaf node device. As an example, if the configuration result of the load sharing from the first root node device to the leaf node device is the first result, the first root node device may perform step 230; or if the configuration result of the load sharing from the first root node device to the leaf node device is the first result, the first root node device may perform step 240.

Step 230: In response to the configuration result being the first result, the first root node device determines that the first root node device is a primary root of the leaf node device.

As an example, the first root node device determines that the first root node device is the primary root, serves as a designated forwarder that forwards multicast traffic to the leaf node device, and may send the multicast traffic to the leaf node device.

Step 240: In response to the configuration result being the second result, the first root node device determines that the first root node device is a secondary root of the leaf node device.

As an example, the first root node device determines that the first root node device is the secondary root, serves as a non-designated forwarder that forwards the multicast traffic to the leaf node device, and may prevent sending the multicast traffic to the leaf node device.

In the foregoing technical solution, each of the root nodes may perform load sharing on the multicast traffic, so as to implement load balancing of the multicast traffic.

Figure 3A:
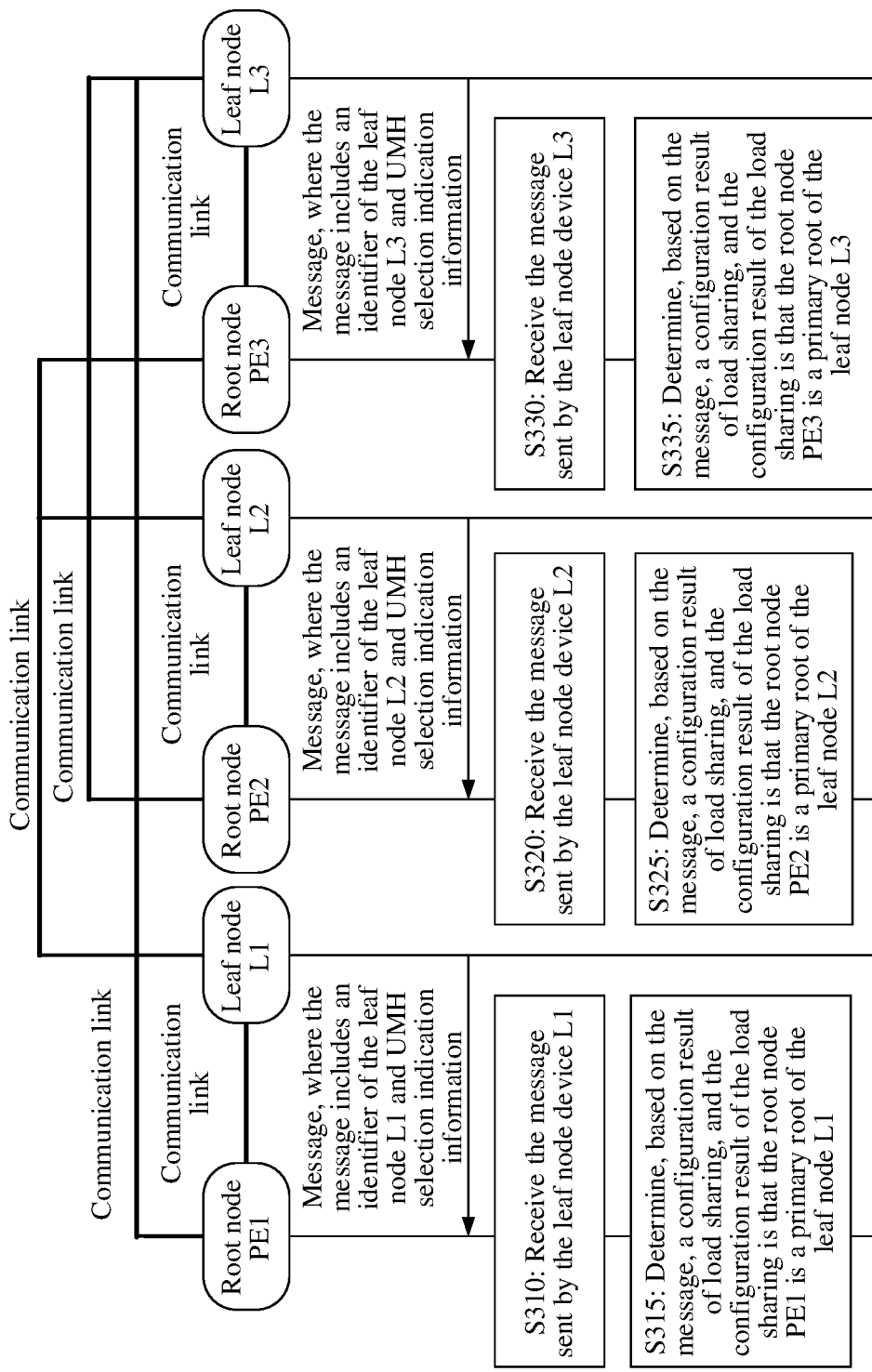
FIG. 3A and FIG. 3B are a schematic flowchart of another load sharing method according to an embodiment of this application.
Figure 3B:
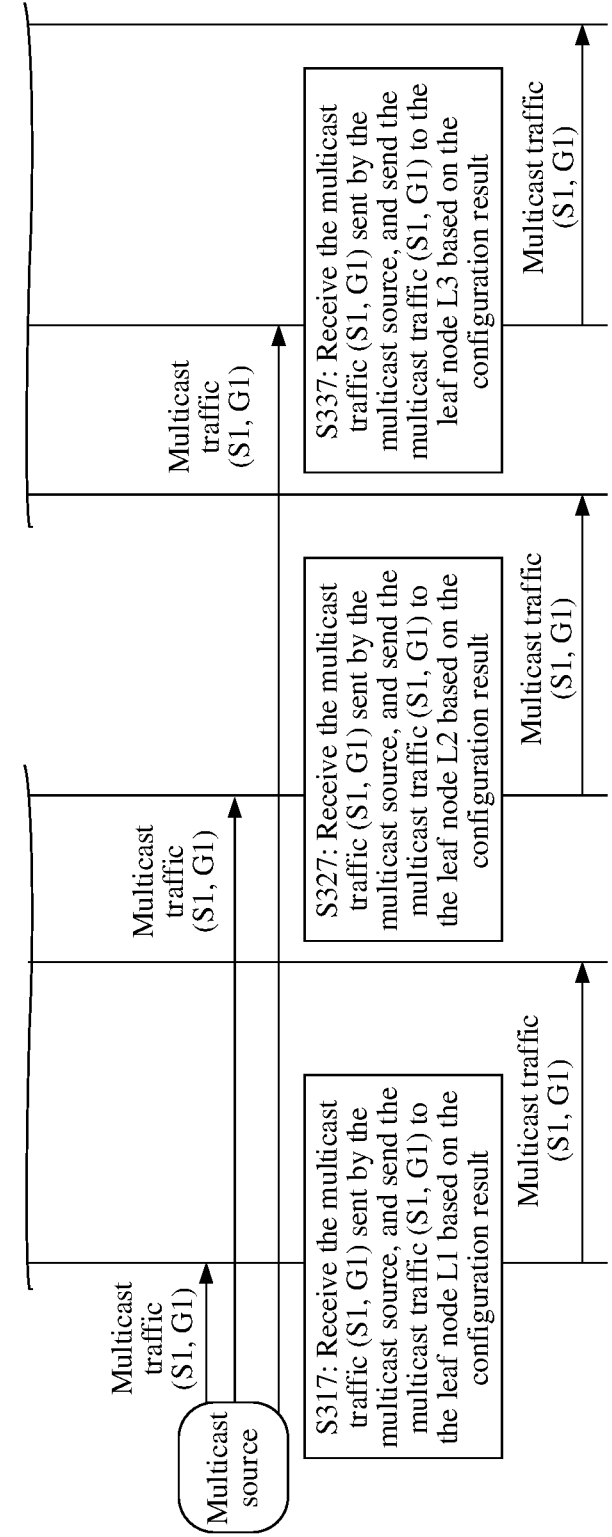

The following uses the multicast scenario shown in FIG. 1 as an example to describe in detail, with reference to FIG. 3A and FIG. 3B, a specific implementation of a load sharing method according to an embodiment of this application. It should be understood that the example in FIG. 3A and FIG.

3B is merely intended to help a person skilled in the art understand embodiments of this application, but is not intended to limit the embodiments of this application to a specific numerical value or a specific scenario in the example. A person skilled in the art can clearly make various equivalent modifications or changes according to the example provided in FIG. 3A and FIG. 3B below, and such modifications or changes also fall within the scope of embodiments of this application.

FIG. 3A and FIG. 3B are a schematic flowchart of another load sharing method according to an embodiment of this application. As shown in FIG. 3A and FIG. 3B, the method may include steps 310 to 337. The following separately describes steps 310 to 337 in detail.

Step 310: A root node PE1 receives a message sent by a leaf node L1, where the message carries an identifier of the leaf node L1 and UMH selection indication information.

As an example, before step 310, a border gateway protocol (BGP) session may be established between PE1 and L1, and a BGP-MVPN address family (or a BGP-MVPN protocol) may be used. The BGP session may be directly established between two devices, or may be established via a routing reflector (RR). This is not specifically limited in this application. For ease of description, the following is an example of directly establishing a BGP session between two devices. For example, H1 may send a multicast join message to L1, where the multicast join message is used to obtain multicast traffic (S1, G1). L1 may send the multicast join message to the root node PE1, the root node PE1 sends the multicast join message to the SW 120, and then the SW 120 sends the multicast join message to the multicast source 110. It should be understood that the multicast join message sent by the multicast receiver H1 is not specifically limited in the embodiments of this application. The message may be an internet group management protocol (IGMP) message, a multicast discovery listener protocol (MLD) message, or a protocol independent multicast protocol (PIM) message. For example, the multicast join message sent by H1 to the leaf node L1 may be an IGMP message or an MLD message, and the multicast join message sent by the root node PE1 to the SW 120 may be a PIM message. The leaf node L1 described above may also send an identifier of the leaf node L1 and UMH selection indication information (which may also be referred to as configuration information) to the root node PE1.

For example, PE1 may send a selective provider multicast service interface (S-PMSI A-D) to the leaf node L1, and specify multicast traffic (S1, G1). After receiving the S-PMSI A-D route, the leaf node L1 sends a Leaf A-D route to the root node PE1. The Leaf A-D route may include an identifier of the leaf node L1 and UMH selection indication information.

As an example, the identifier of the leaf node L1 may be an IP address of the leaf node L1, and is carried in network layer reachability information (NLRI) of the Leaf A-D route. In this way, in a process of transferring the Leaf A-D route, for example, in a process of re-advertisement of a route by a route reflector (RR) or an autonomous system edge router (ASBR), the identifier of the leaf node of the Leaf A-D route does not change. The UMH selection indication information described above may be used to indicate the primary root and the secondary root selected by the leaf node L1, or may be further used to indicate that it is determined, by the root node (PE1/PE2/PE3), that the root node serves as the primary root and the secondary root of the leaf node L1. The following separately describes different implementations in detail.

It should be understood that, for ease of description, the following uses multicast traffic (S1, G1) as an example for description.

1. In a possible implementation, a UMH selection indication information indicates a primary root and a secondary root selected by a leaf node L1.

In this example, the leaf node L1 selects PE1 as the primary root and PE2/PE3 as the secondary root. That is, PE1 is responsible for sending multicast traffic to L1. When PE1 is working properly, PE2 and PE3 are in a standby state and are not responsible for sending multicast traffic to L1. A specific form of the UMH selection indication information is not limited in embodiments of this application, provided that the UMH selection indication information sent to PE1 and the UMH selection indication information sent to PE 2/PE3 can be distinguished. In an example, the UMH selection indication information in a message sent by L1 to PE1 may be "primary", indicating that L1 selects PE1 as the primary root. The UMH selection indication information sent by L1 to PE2 and PE3 is "secondary", indicating that L1 selects PE2 and PE3 as the secondary roots. In another example, the UMH selection indication information in the message sent by L1 to PE1 may be "NULL", that is, "NULL" is "primary" by default when there is no additional information, indicating that L1 selects PE1 as the primary root. The UMH selection indication information sent to PE2 and PE3 is "secondary", "backup", or "standby", indicating that L1 selects PE2 and PE3 as the secondary roots.

For example, information sent by the leaf node L1 to the root node PE1 is (S1, G1, node ID=L1, UMH selection information=primary). Optionally, information sent by the leaf node L1 to the root node PE2 is (S1, G1, node ID=L1, UMH selection information=secondary); and information sent to the root node PE3 is (S1, G1, node ID=L1, UMH selection information=secondary).

2. In another possible implementation, a UMH selection indication information indicates that a candidate root node (PE1/PE2/PE3) serving as a primary root of a leaf node L1 determines itself as the primary root of the leaf node L1.

Taking the leaf node L1 as an example, the UMH selection indication information in a message sent by L1 to the root node PE1 is no longer indication information of the primary or secondary, but notifies the root node PE1 of a candidate root node set (PE1/PE2/PE3) serving as the primary root of the leaf child node L1. The root node PE1 determines whether to function as the primary root of L1.

For example, information sent by the leaf node L1 to the root node PE1 is (S1, 1, node ID=L1, UMH selection information=information 1). Optionally, information sent by the leaf node L1 to the root node PE2 is (S1, G1, node ID=L1, UMH selection information=information 1), and information sent to the root node PE3 is (S1, G1, node ID=L1, UMH selection information=information 1).

The foregoing information 1 may include information about a candidate root node that serves as a primary root of the leaf node L1, and the information may be, for example, an identifier of the candidate root node. There are a plurality of specific implementations of the identifier. The following is a detailed description of several possible implementations. It should be understood that, for ease of description, an example in which candidate root nodes serving as the primary root of the leaf L1 include PE1, PE2, and PE3 is used for description in FIG. 3A and FIG. 3B.

Specifically, as an example, the identifier may be an ID of PE1, an ID of PE2, or an ID of PE3. For example, the ID of PE1, the ID of PE2, or the ID of PE3 may be an IP address of each of PEs. For example, the IP address of PE1/PE2/PE3 is 192.168.10.1, 192.168.20.1, or 192.168.30.1, respectively. For another example, the ID of PE1, the ID of PE2, or the ID of PE3 may also be an IPv6 address of each of PEs. For example, the IPv6 address of PE1/PE2/PE3 is 2001:db8:1::1234, 2001:db8:2::1234, or 2001:db8:3::1234, respectively. For yet another example, the ID of PE1, the ID of PE2, or the ID of PE3 may also be an identifier configured on each of PEs. It is assumed that PE1/PE2/PE3 serves as a group of routers and shares an Anycast IP address 192.168.0.1, which is used to identify the group of routers (or group IDs), and an integer 1/2/3 is separately configured to identify each of PEs. For example, the ID of PE1/PE2/PE3 may be 192.168.0.1:1, 192.168.0.1:2, or 192.168.0.1:3. For another example, the identifier may include an identifier (for example, 192.168.0.1) of a group of routers PE1/PE2/PE3, and further include a BitString om to indicate a router whose ID is 1, 2, or 3. For example, a first position 1 from right to left of the bit string (BitString) identifies a PE 1 whose ID is 1, a second position 1 from right to left of the BitString identifies a PE 2 whose ID is 2, and a third position 1 from right to left of the BitString identifies a PE 3 whose ID is 3. For another example, the identifier may include only a group ID, where the group ID represents a group of routers PE1/PE2/PE3, and may be the foregoing Anycast IP address. Then, a correspondence between the Anycast IP and the three routers is separately configured on the three routers represented by the group ID.

Optionally, the foregoing information 1 may further include a count, indicating a quantity of root nodes included in a candidate root node set serving as a primary root of the leaf node L1.

Optionally, the foregoing information 1 may further include indication information, where the indication information indicates that a root node included in a candidate root node set serving as a primary root of the leaf node L1 determines itself as the primary root of L1. For example, the indication information may be identified via an auto-select-by-root.

Specifically, for example, the foregoing information 1 may be <PE1, PE2, PE3, auto-select-by-root>, where <PE1, PE2, PE3> represents a root node included in a candidate root node set serving as a primary root of a leaf node L1, and <auto-select-by-root> represents that PE1/PE2/PE3 is determined as the primary root of L1 by itself. There are a plurality of specific implementations of determining. The following describes several possible methods in detail, and details are not described herein.

Step 315: The root node PE1 determines a configuration result of the load sharing based on the message sent by the leaf node L1, where the configuration result is that the root node PE1 is a primary root of the leaf node L1.

1. In a possible implementation, the UMH selection indication information indicates a primary root and a secondary root selected by the leaf node. For PE1, the message that is sent by the leaf node L1 and that is received by PE1 is (S1, G1, node ID=L1, UMH selection information=primary). Optionally, the message that is sent by the leaf node L2 and that is received by PE1 is (S1, G1, node ID=L2, UMH selection information=secondary); the message that is sent by the leaf node L3 and that is received by PE1 is (S1, G1, node ID=L3, UMH selection information=secondary). PE1 may determine, based on the UMH selection information, that PE1 serves as the primary root of the leaf node L1, and is responsible for forwarding multicast traffic to the leaf node L1.

2. In another possible implementation, a UMH selection indication information indicates that a candidate root node (PE1/PE2/PE3) serving as a primary root of a leaf node L1 determines itself as the primary root of the leaf node L1.

Specifically, in an example, a highest random weight (HRW) method may be used, hash calculation is performed by an identifier of each of candidate root nodes (PE1/PE2/PE3) and the leaf node L1, and the primary root of the leaf node L1 is determined based on a hash calculation result.

For PE1, a method for performing HRW calculation based on the identifier of the leaf node L1 and information about the candidate root nodes (PE1/PE2/PE3) is as follows: performing hash calculation on the identifier of PE1 and the identifier of L1, to obtain a result 11, which is represented as hash11=HRW (L1 ID, PE1 ID). Similarly, hash calculation is performed on the identifier of PE2 and the identifier of L1, to obtain a result 21, which is represented as hash21=HRW (L1 ID, PE2 ID). Similarly, the hash calculation is performed on the identifier of PE3 and the identifier of L1, to obtain a result 31, which is represented as hash31=HRW (L1 ID, PE3 ID). PE1 may compare the several hash values to determine a maximum value. For example, the maximum value in hash11/hash21/hash31 is hash11, that is, a value obtained by performing hash calculation via PE1 is a maximum hash value or a maximum random weight, and may be represented as HRW (L1, candidate (PE1, PE2, PE3))=PE1. In this case, PE1 serves as a DF of L1. Based on the result, PE1 determines that PE1 serves as the primary root of L1 and is responsible for sending multicast traffic to L1.

Similarly, for PE2, HRW calculation is also performed based on the identifier of L1 node and the information about the candidate root nodes (PE1/PE2/PE3). The calculation result is the same as that calculated on PE1. That is, the calculation result of HRW (L1, candidate (PE1, PE2, PE3)) is also PE1. Therefore, PE2 determines, based on the result, that PE2 is not the primary root of L1 and is not responsible for sending traffic to L1. For PE3, PE3 also performs the HRW calculation based on the identifier of L1 node and the information about the candidate root nodes (PE1/PE2/PE3). The calculation result is the same as that calculated on PE1 and PE2. Therefore, PE3 determines, based on the result, that PE3 is not the primary root of L1 and is not responsible for sending traffic to L1.

Specifically, in another example, multicast traffic may also be involved in Hash calculation. Taking traffic of (S1, G1) as an example, by using an HRW method, hash (hash) calculation is performed on each of candidate root nodes (PE1/PE2/PE3), an identifier of a leaf node L1, and (S1, 1), and a primary root of the leaf node L1 is determined based on a hash calculation result. A specific implementation is similar to the method in the foregoing example. For details, refer to the Hash calculation method described in the previous example. Details are not described herein again.

Specifically, in another example, in a scenario in which a BIER is used to perform multicast forwarding, PE1 may further perform selection based on a BitString. In an example, PE1 serves as a primary root of leaf nodes included in N*3 (N=0/1/ . . . ), and is preferentially responsible for sending multicast traffic to the leaf nodes included in N*3 (N=0/1 . . . ). As a primary root of leaf nodes included in N*3+1 (N=0/1 . . . ), PE2 is preferentially responsible for sending multicast traffic to the leaf nodes included in N*3+1 (N=0/ . . . ). PE3 serves as a primary root of leaf nodes included in N*3+2 (N=0/1 . . . ), and is preferentially responsible for sending multicast traffic to the leaf nodes included in N*3+2 (N=0/1 . . . ).

For example, when N=0, PE1 serves as a primary root of leaf nodes (BFR IDs are 1 to 256, respectively) included in a zeroth set or set ID=0, and is responsible for sending multicast traffic to the leaf nodes whose BFR IDs are 1 to 256 respectively. Similarly, PE2 serves as a primary root of leaf nodes (BFR Ids are 257 to 512, respectively) included in a first set or set ID=1, and is responsible for sending multicast traffic to the leaf nodes whose BFR IDs are 257 to 512 respectively. PE3 serves as a primary root of leaf nodes (BFR IDs are 513 to 768, respectively) included in a second set or set ID=2, and is responsible for sending multicast traffic to the leaf nodes whose BFR IDs are 513 to 768 respectively. Assume that the leaf node L1 corresponds to set 0, L2 corresponds to set 1, and L3 corresponds to set 2. PE1 functions as the primary root of L1 and is responsible for sending multicast traffic to L1, PE2 functions as the primary root of L2 and is responsible for sending multicast traffic to L2, and PE3 functions as the primary root of L3 and is responsible for sending multicast traffic to L3.

In another example, in a scenario in which a BIER is used to perform multicast forwarding, an HRW method may be used to perform hash calculation by each of the candidate root nodes (PE1/PE2/PE3) and a set ID, and determine, based on a hash calculation result, a primary root of a leaf node corresponding to the set.

The leaf node corresponding to the set ID=0 is used as an example. A method for performing, by PE1, HRW calculation based on the set ID=0 and the information about the candidate root nodes (PE1/PE2/PE3) is as follows: performing hash calculation on the identifier of PE1 and the set ID=0, to obtain a result 11, which is represented as hash11=HRW (Set ID<0>, PE1 ID). Similarly, hash calculation is performed on the identifier of PE2 and the set ID=0, to obtain a result 21, which is represented as hash21=HRW (Set ID<0>, PE2 ID). Similarly, hash calculation is performed on the identifier of PE3 and the set ID=0, to obtain a result 31, which is represented as hash31=HRW (Set ID<0>, PE3 ID). PE1 may compare the several hash values to determine a maximum value. For example, the maximum value in hash11/hash21/hash31 is hash11, that is, a value obtained by performing hash calculation via PE1 is a maximum hash value or a maximum random weight, and may be represented as HRW (set ID=0, candidate (PE1, PE2, PE3)) =PE1. In this case, PE1 serves as a DF of all leaf nodes (nodes whose BFR IDs are 1 to 256, respectively) with the set ID=0. Based on the result, PE1 can determine that PE1 serves as the primary root of all leaf nodes (BFR IDs are 1 to 256, respectively) with the set ID=0, and is responsible for sending multicast traffic to all leaf nodes (BFR IDs are 1 to 256, respectively) with the set ID=0. Assuming that the leaf node L1 corresponds to set 0, PE1 may determine that PE1 serves as the primary root of L1 and is responsible for sending multicast traffic to L1.

Similarly, PE2 and PE3 also perform HRW calculation based on the set ID=0 and the information about the candidate root nodes (PE1/PE2/PE3). The calculation result is the same as that calculated on PE1. That is, the calculation result of HRW (set ID=0, candidate (PE1, PE2, PE3)) is also PE1. Therefore, PE2 and PE3 may determine, based on the result, that they are not the primary roots of all leaf nodes (nodes whose BFR IDs are 1 to 256, respectively) with the set ID=0, and are not responsible for sending multicast traffic to all leaf nodes (nodes whose BFR IDs are 1 to 256, respectively) with the set ID=0. Assuming that the leaf node L1 corresponds to set 0, PE2 and PE3 may determine that they are not the primary roots of L1 and are not responsible for sending multicast traffic to L1.

Step 317: The root node PE1 receives the multicast traffic (S1, G1) sent by the multicast source no, and sends the multicast traffic (S1, G1) to the leaf node L1 based on a configuration result of the load sharing.

A sequence of performing step 315 and step 317 is not specifically limited in embodiments of this application. Step 315 may be performed before step 317, or step 317 may be performed before step 315, or step 315 and step 317 may be simultaneously performed.

That is, if step 315 is performed before step 317, the root node PE1 has determined that the configuration result of load sharing before receiving the multicast traffic (S1, G1), and the root node PE1 may forward, based on the configuration result of load sharing, the multicast traffic (S1, G1) when receiving the multicast traffic (S1, G1). If step 317 is performed before step 315, the root node PE1 does not obtain the configuration result after receiving the multicast traffic (S1, G1), and the root node PE1 may forward the multicast traffic (S1, G1), based on the configuration result of load sharing after the configuration result of load sharing is determined. In this way, duplicate traffic transmission caused by forwarding the multicast traffic before the configuration result is determined can be avoided. The following describes in detail a specific implementation procedure in which the root node PE1 forwards the multicast traffic (S1, G1) based on the configuration result of load sharing. For example, the root node PE1 serves as the primary root of the leaf node L1. After receiving the multicast traffic (S1, G1), PE1 may determine that the multicast traffic (S1, G1) needs to be forwarded to the leaf node L1. Specifically, as an example, a "stateless" tunnel may be used between the root node PE1 and the leaf node L1, and the multicast traffic (S1, G1) is sent to the leaf node L1 through the tunnel. For example, an example of a stateless tunnel header is a BIER tunnel header or a BIER header. That is, the root node PE1 may encapsulate a BIER header for the multicast traffic (S1, G1), where the BIER header may include a bit string field, and a value of a bit corresponding to the leaf node L1 in the bit string is 1.

It should be understood that each of the bits in the bit string is used to identify an edge BFR (for example, a BFIR or a BFER). For example, one bit of a least significant bit (rightmost) of the bit string is used to identify a BFER whose BFR-ID is 1. A second bit from the right to the left in the bit string identifies a BFER whose BFR-ID is equal to 2. For a forwarding entry based on which a forwarding plane performs forwarding, several specific BFERs to which a packet is to be sent are determined based on a bit string in the packet. When receiving a packet including a BIER header, the BFR in the BIER domain forwards the BIER packet based on a bit string and a BIFT ID that are carried in the BIER header. It should be noted that a value 1 of the bit indicates that the packet needs to be sent to a BFER device represented by the BFR-ID, and a value 0 of the bit indicates that the packet does not need to be sent to the BFER device represented by the BFR-ID.

Step 320: A root node PE2 receives a message sent by a leaf node L2, where the message carries an identifier of the leaf node L2 and UMH selection indication information.

1. In a possible implementation, the UMH selection indication information indicates a primary root and a secondary root selected by the leaf node L2. In this example, the leaf node L2 selects PE2 as the primary root and PE1/PE3 as the secondary root. In an example, the UMH selection indication information in a message sent by L2 to PE2 may be "primary", indicating that L2 selects PE2 as the primary root. The UMH selection indication information sent by L2 to PE1 and PE3 is "secondary", indicating that L2 selects PE1 and PE3 as the secondary roots. In another example, the UMH selection indication information in the message sent by L2 to PE2 may be "NULL", that is, "NULL" is "primary" by default when there is no additional information, indicating that L2 selects PE2 as the primary root. The UMH selection indication information sent to PE1 and PE3 is "secondary", "backup", or "standby", indicating that L2 selects PE1 and PE3 as the secondary roots.

For example, information sent by the leaf node L2 to the root node PE2 is (S1, G1, node ID=L2, UMH selection information=primary). Optionally, the information sent by the leaf node L2 to the root node PE1 is (S1, G1, node ID=L2, UMH selection information=secondary); and the information sent to the root node PE3 is (S1, G1, node ID=L2, UMH selection information=secondary). 2. In another possible implementation, the UMH selection indication information indicates that a candidate root node (PE1/PE2/PE3) serving as a primary root of the leaf node L2 determines itself as the primary root and a secondary root of the leaf node L2. For example, the information sent by the leaf node L2 to the root node PE2 is (S1, G1, node ID=L2, UMH selection information=information 2<PE1, PE2, PE3>). Optionally, the information sent by the leaf node L2 to the root node PE1 is (S1, G1, node ID=L2, UMH selection information=information 2<PE1, PE2, PE3>); and the information sent to the root node PE3 is (S1, G1, node ID=L2, UMH selection information=information 2<PE1, PE2, PE3>).

Step 325: The root node PE2 determines a configuration result of the load sharing based on the message sent by the leaf node L2, where the configuration result is that the root node PE2 is a primary root of the leaf node L2.

There are various methods for implementation. The following uses HRW as an example to describe how to perform hash calculation by each of the candidate root nodes (PE1/PE2/PE3) and an identifier of the leaf node L2 to determine as the primary root of the leaf node L2. Another implementation is similar to the method in step 315. For details, refer to the description in step 315. Details are not described herein again. For PE1, a method for performing HRW calculation based on the identifier of the leaf node L2 and information about the candidate root nodes (PE1/PE2/PE3) is as follows: performing hash calculation on the identifier of PE1 and the identifier of L2, to obtain a result 12, which is represented as hash12=HRW (L2 ID, PE1 ID). Similarly, hash calculation is performed on the identifier of PE2 and the identifier of L2, to obtain a result 22, which is represented as hash22=HRW (L2 ID, PE2 ID). Similarly, the hash calculation is performed on the identifier of PE3 and the identifier of L2, to obtain a result 32, which is represented as hash32=HRW (L2 ID, PE3 ID). PE1 may compare the several hash values to determine a maximum value. For example, the maximum value in hash12/hash22/hash32 is hash22, that is, a value obtained by performing hash calculation via PE2 is a maximum hash value or a maximum random weight, and may be represented as HRW (L2, candidate (PE1, E2, PE3))=PE2. In this case, PE2 serves as a DF of L2. Based on the result, PE1 determines that PE1 is not the primary root of L2 and is not responsible for sending traffic to L2. Similarly, for PE2, HRW calculation is also performed based on the identifier of L2 node and the information about the candidate root nodes (PE1/PE2/PE3). The calculation result is the same as that calculated on PE1. That is, the calculation result of HRW (L2, candidate (PE1, PE2, PE3)) is also PE2.

Therefore, PE2 determines, based on the result, that PE2 serves as the primary root of L2 and is responsible for sending traffic to L2. For PE3, PE3 also performs the HRW calculation based on the identifier of L3 node and the information about the candidate root nodes (PE1/PE2/PE3). The calculation result is the same as that calculated on PE1 and PE2. Therefore, PE3 determines, based on the result, that PE3 is not the primary root of L2 and is not responsible for sending traffic to L2.

Step 327: The root node L2 receives the multicast traffic (S1, G1) sent by the multicast source, and sends the multicast traffic (S1, G1) to the leaf node L2 based on a configuration result of the load sharing determined separately. For example, the root node PE2 serves as the primary root of the leaf node L2. After receiving the multicast traffic (S1, G1), the root node PE2 may also forward the multicast traffic (S1, G1) to the leaf node L2. By taking a BIER tunnel as an example, the root node PE2 may encapsulate a BIER header for the multicast traffic (S1, G1), where the BIER header may include a bit string field, and a value of a bit corresponding to the leaf node L2 in the bit string is 1. Step 330: The root node PE3 receives a message sent by the leaf node L3, where the message carries an identifier of the leaf node L3 and UMH selection indication information. 1. In a possible implementation, the UMH selection indication information indicates a primary root and a secondary root selected by the leaf node L3. In this example, the leaf node L3 selects PE3 as the primary root and PE2/PE3 as the secondary root. In an example, the UMH selection indication information in a message sent by L3 to PE3 may be "primary", indicating that L3 selects PE3 as the primary root. The UMH selection indication information sent by L3 to PE2 and PE3 is "secondary", indicating that L3 selects PE2 and PE3 as the secondary roots.

In another example, the UMH selection indication information in the message sent by L3 to PE3 may be "NULL", that is, "NULL" is "primary" by default when there is no additional information, indicating that L3 selects PE3 as the primary root. The UMH selection indication information sent to PE2 and PE3 is "secondary", "backup", or "standby", indicating that L3 selects PE2 and PE3 as the secondary roots.

For example, information sent by the leaf node L3 to the root node PE3 is (S1, G1, node ID=L3, UMH selection information=primary). Optionally, information sent by the leaf node L3 to the root node PE1 is (S1, G1, node ID=L3, UMH selection information=secondary); and information sent to the root node PE2 is (S1, G1, node ID=L3, UMH selection information=secondary).

2. In another possible implementation, the UMH selection indication information indicates that a candidate root node (PE1/PE2/PE3) serving as a primary root of the leaf node L3 determines itself as the primary root and a secondary root of the leaf node L3. For example, information sent by the leaf node L3 to the root node PE3 is (S1, G1, node ID=L3, UMH selection information=information 3<PE1, PE2, PE3>). Optionally, information sent by the leaf node L3 to the root node PE1 is (S1, 1, node ID=L3, UMH selection information=information 3<PE1, PE2, PE3>); and information sent to the root node PE2 is (S1, G1, node ID=L3, UMH selection information=information 3<PE1, PE2, PE3>). Step 335: The root node PE3 determines a configuration result of the load sharing based on the message sent by the leaf node L3, where the configuration result is that the root node PE3 is a primary root of the leaf node L3. There are various methods for implementation. The following uses HRW method as an example to describe how to perform hash calculation by each of the candidate root nodes (PE1/PE2/PE3) and an identifier of the leaf node L3 to determine as the primary root of the leaf node L3. Another implementation is similar to the method in step 315. For details, refer to the description in step 315. Details are not described herein again.

For PE1, a method for performing HRW calculation based on the identifier of the leaf node L3 and information about the candidate root nodes (PE1/PE2/PE3) is as follows: performing hash calculation on the identifier of PE1 and the identifier of L3, to obtain a result 13, which is represented as hash13=HRW (L3 ID, PE1 ID). Similarly, hash calculation is performed on the identifier of PE2 and the identifier of L3, to obtain a result 23, which is represented as hash23=HRW (L3 ID, PE2 ID). Similarly, hash calculation is performed on the identifier of PE3 and the identifier of L3, to obtain a result 33, which is represented as hash33=HRW (L3 ID, PE3 ID). PE1 may compare the several hash values to determine a maximum value. For example, the maximum value in hash13/hash23/hash33 is hash33, that is, a value obtained by performing hash calculation via PE3 is a maximum hash value or a maximum random weight, and may be represented as HRW (L3, candidate (PE1, PE2, PE3))=PE3. In this case, PE3 serves as a DF of L3. Based on the result, PE1 determines that PE1 is not the primary root of L3 and is not responsible for sending traffic to L3. Similarly, for PE2, HRW calculation is also performed based on the identifier of L3 node and the information about the candidate root nodes (PE1/PE2/PE3). The calculation result is the same as that calculated on PE1. That is, the calculation result of HRW (L3, candidate (PE1, PE2, PE3)) is also PE3. Therefore, PE2 determines that PE2 is not the primary root of L3 and is not responsible for sending traffic to L3. For PE3, PE3 also performs the HRW calculation based on the identifier of L2 node and the information about the candidate root nodes (PE1/PE2/PE3). The calculation result is the same as that calculated on PE1 and PE2. Therefore, PE3 determines, based on the result, that PE3 is the primary root of L3 and is responsible for sending traffic to L3.

Step 337: The root node PE3 receives the multicast traffic (S1, G1) sent by the multicast source, and sends the multicast traffic (S1, G1) to the leaf node L3 based on a configuration result of the load sharing determined separately.

For example, the root node PE3 serves as the primary root of the leaf node L3. After receiving the multicast traffic (S1, G1), the root node PE3 may also forward the multicast traffic (S1, G1) to the leaf node L3. By taking a BIER tunnel as an example, the root node PE3 may encapsulate a BIER header for the multicast traffic (S1, G1), where the BIER header may include a bit string field, and a value of a bit corresponding to the leaf node L3 in the bit string is 1.

In the foregoing technical solution, each of the root nodes may perform load sharing when a service works properly, so that a service volume of a single device is reduced, thereby avoiding a fault caused by an excessively heavy load of the single device. Optionally, when a root node cannot work properly, another available root node shares multicast traffic on the root node that cannot work properly. In embodiments of this application, that a root node cannot work properly may be understood as that the root node cannot work properly because the root node is faulty, for example, is powered off. Alternatively, it may be understood that a link between the root node and another device is faulty, and consequently the root node cannot work properly. For example, a link between the root node and a leaf node connected to the root node is faulty. The following describes in detail different implementations of sharing multicast traffic of PE1 by another available root node (for example, PE2 or PE3) by taking an example in which the root node PE1 is faulty. In a possible implementation, after determining that PE1 itself is faulty or a link between PE1 and L1 is faulty, L1 sends the UMH selection indication information to the root node (PE2/PE3) again. In an example, it is assumed that L1 re-determines PE2 as the primary root of L1, and PE2 is responsible for sending multicast traffic (S1, G1) to L1.

The information sent by L1 to PE2 is (S1, G1, node ID=L1, UMH selection information=primary); and the information sent by L1 to PE3 is (S1, G1, node ID=L1, UMH selection information=secondary). PE2 may determine, based on the UMH selection information, that PE2 serves as a primary root of the leaf node L1, and is responsible for forwarding multicast traffic to the leaf node L1. PE3 determines, according to the UMH selection information, that PE3 serves as a secondary root of the leaf node L1. In another example, the information sent by L1 to PE2 is (S1, G2, node ID=L1, UMH selection information=information 1<PE2, PE3, auto-select-by-root>); and the information sent by L1 to PE3 is (S1, G2, node ID=L1, UMH selection information=information 1<PE2, PE3, auto-select-by-root>). PE2 and PE3 may determine, based on any one of the methods in step 320, that PE2 and PE3 serve as the primary root and the secondary root of the leaf node L1. Assume that PE2 serves as the primary root of L1, and PE2 is responsible for sending multicast traffic (S1, G1) to L1. In another possible implementation, after PE2 and PE3 each determine that PE1 is faulty, PE2 and PE3 determine, by themselves, a root node responsible for sending multicast traffic (S1, G1) to L1. For example, PE2 and PE3 determine, based on the value of hash21 is greater than the value of hash31, that PE2 serves as the primary root of L1, and PE2 is responsible for sending multicast traffic (S1, G1) to L1. In embodiments of this application, a switching result obtained by PE2/PE3 based on the detected fault information of PE1 is the same as that obtained by update information sent by L1 to PE2/PE3 after L1 detects the fault of PE1, either of which occurs first can trigger the switching. In this way, performance can be improved, and the time of multicast traffic interruption due to a node failure can be reduced. If PE1 fails or the link between PE1 and L1 fails, PE2 functions as both the primary root of L1 and the primary root of L2. PE2 sends multicast traffic (S1, G1) to L1 and L2 separately. By taking a BIER tunnel as an example, the root node PE2 may encapsulate a BIER header for the multicast traffic (S1, G1), where the BIER header may include a bit string field, and both of the values of bits corresponding to the leaf nodes L1, L2 in the bit string are 1.

PE3 still functions as the primary root of L3 and is responsible for forwarding multicast traffic (S1, G1) to L3. That is, if one root node fails, traffic is still load shared.

In the foregoing technical solution, each of the root nodes can perform load sharing when a service works properly, so as to reduce a service volume of a single device, can perform fast protection when the device is faulty, and can also perform effective protection when a link between a leaf node and a root node is faulty.

It should be understood that sequence numbers of the foregoing processes do not mean execution sequences in the embodiments of this application. The execution sequences of the processes should be determined based on functions and internal logic of the processes, and should not constitute any limitation on implementation processes of the embodiments of this application.

With reference to FIG. 1 to FIG. 3A and FIG. 3B, the foregoing describes in detail the load sharing method provided in the embodiments of this application. The following describes in detail the embodiments of the device of this application with reference to FIG. 4 to FIG. 9. It should be understood that the descriptions of the method embodiments correspond to descriptions of the apparatus embodiments. Therefore, for parts that are not described in detail, refer to the descriptions in the foregoing method embodiments.

Figure 4:
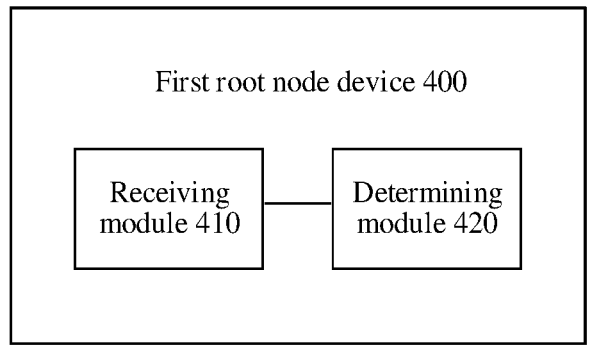
FIG. 4 is a schematic diagram of a structure of a first root node device 400 according to an embodiment of this application.

FIG. 4 is a schematic diagram of a structure of a first root node device 400 according to an embodiment of this application. The first root node device 400 shown in FIG. 4 may perform corresponding steps performed by the first root node device in the methods of the foregoing embodiments. As shown in FIG. 4, the first root node device 400 includes a receiving module 410 and a determining module 420.

The receiving module 410 is configured to receive a message sent by the leaf child node device, where the message includes a first identifier and configuration information, the first identifier indicates the leaf child node device, the configuration information indicates a configuration manner of load sharing from the root node device group to the leaf child node device that is requested by the leaf child node device, and the root node device group includes the first root node device.

The determining module 420 is configured to determine a configuration result of the load sharing from the first root node device to the leaf node device based on the first identifier and the configuration information.

The determining module 420 is further configured to: in response to the configuration result being a first result, determine that the first root node device is a primary root of the leaf node device, where the primary root indicates that the first root node device is a designated forwarder that forwards the multicast traffic to the leaf node device; or the determining module 420 is further configured to: in response to the configuration result being a second result, determine that the first root node device is a secondary root of the leaf node device, where the secondary root indicates that the first root node device is a non-specified forwarder that forwards the multicast traffic to the leaf node device.

Optionally, the configuration information includes first indication information, and the first indication information indicates that the first root node device is a primary root of the leaf node device.

Optionally, the configuration information includes second indication information, and the second indication information indicates that the first root node device is a secondary root of the leaf node device.

Optionally, the configuration information includes third indication information, and the third indication information indicates information about a candidate root node device serving as the primary root of the leaf node device.

Optionally, the candidate root node device includes the first root node device, and the determining module 420 is further configured to perform hash calculation on the first identifier and the configuration information, to obtain the configuration result.

Optionally, the message further includes a multicast source group (S, G), the candidate root node device includes the first root node device, and the determining module 420 is further configured to perform hash calculation on the multicast source group (S, G), the first identifier, and the configuration information, to obtain the configuration result.

Optionally, the receiving module 410 is configured to receive the multicast traffic; and the first root node device further includes: a sending module 430, configured to send the multicast traffic to the leaf node device in response to the first root node device being a primary root of the leaf node device.

Figure 5:
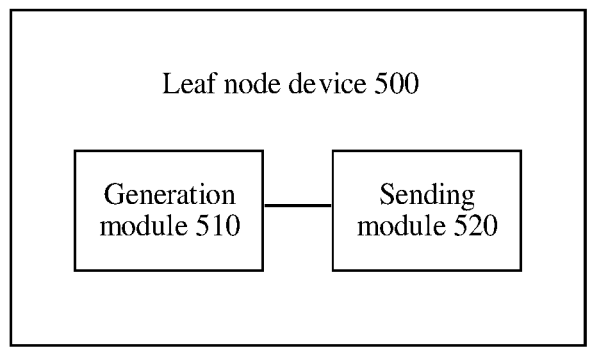
FIG. 5 is a schematic diagram of a structure of a leaf node device 500 according to an embodiment of this application.

FIG. 5 is a schematic diagram of a structure of a leaf node device 500 according to an embodiment of this application. The leaf node device 500 shown in FIG. 5 may perform corresponding steps performed by the leaf node device in the methods of the foregoing embodiments. As shown in FIG. 5, the leaf node device 500 includes a generation module 510 and a sending module 520.

The generation module 510 is configured to generate a message, where the message includes a first identifier and configuration information, the first identifier indicates the leaf node device, and the configuration information indicates a configuration mode, requested by the leaf node device, of load sharing from the root node device group to the leaf node device.

The sending module 520 is configured to send the message to a first root node device, where the root node device group includes the first root node device.

Optionally, the configuration information includes first indication information, the first indication information indicates that the first root node device is a primary root of the leaf node device, and the primary root indicates that the first root node device is a designated forwarder that forwards the multicast traffic to the leaf node device.

Optionally, the configuration information includes second indication information, the second indication information indicates that the first root node device is a secondary root of the leaf node device, and the secondary root indicates that the first root node device is a non-designated forwarder that forwards the multicast traffic to the leaf node device.

Optionally, the configuration information includes third indication information, and the third indication information indicates information about a candidate root node device serving as the primary root of the leaf node device.

Optionally, the first root node device is a primary root of the leaf node device, and the leaf node device 500 further includes: a receiving module 530, configured to receive the multicast traffic sent by the first root node device.

Figure 6:
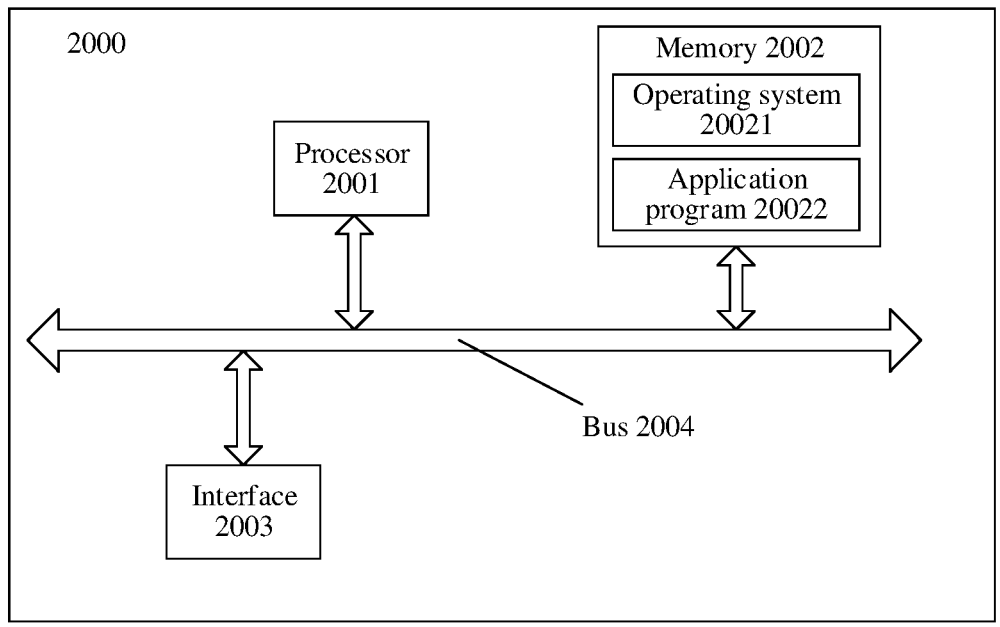
FIG. 6 is a schematic diagram of a hardware structure of a first root node device 2000 according to an embodiment of this application.

FIG. 6 is a schematic diagram of a hardware structure of a first root node device 2000 according to an embodiment of this application. As shown in FIG. 6, the first root node device 2000 may perform corresponding steps performed by the first root node device in the methods of the foregoing embodiments.

As shown in FIG. 6, the first root node device 2000 includes a processor 2001, a memory 2002, an interface 2003, and a bus 2004. The interface 2003 may be implemented in a wireless or wired manner, and may be specifically a network adapter. The processor 2001, the memory 2002, and the interface 2003 are connected through the bus 2004.

The interface 2003 may specifically include a transmitter and a receiver, and is configured to enable the first network device to implement the foregoing receiving and sending. For example, the interface 2003 is configured to support the first root node device in receiving a message sent by the leaf node device.

The processor 2001 is configured to perform processing that is performed by the first root node device in the foregoing embodiment. For example, configured to determine, based on the first identifier and the configuration information, a configuration result of the load sharing from the first root node device to the leaf node device; and/or used in another process of the technology described in this specification. The memory 2002 includes an operating system 20021 and an application program 20022, and is configured to store programs, a code, or instructions. When executing the programs, the code, or the instructions, the processor or a hardware device may complete the processing processes of the first root node device in the method embodiments. Optionally, the memory 2002 may include a read-only memory (ROM) and a random access memory (RAM). The ROM includes a basic input/output system (BIOS) or an embedded system, and the RAM includes an application program and an operating system. When the first root node device 2000 needs to be run, a BIOS built into the ROM or a bootloader in an embedded system is used to boot a system to start, and boot the first root node device 2000 to enter a normal operating status. After entering the normal operating status, the first root node device 2000 runs the application program and the operating system in the RAM, so as to complete the processing processes of the first root node device 2000 in the method embodiments.

It may be understood that FIG. 6 shows only a simplified design of the first root node device 2000. In an actual application, the first root node device may include any quantity of interfaces, processors, or memories.

Figure 7:
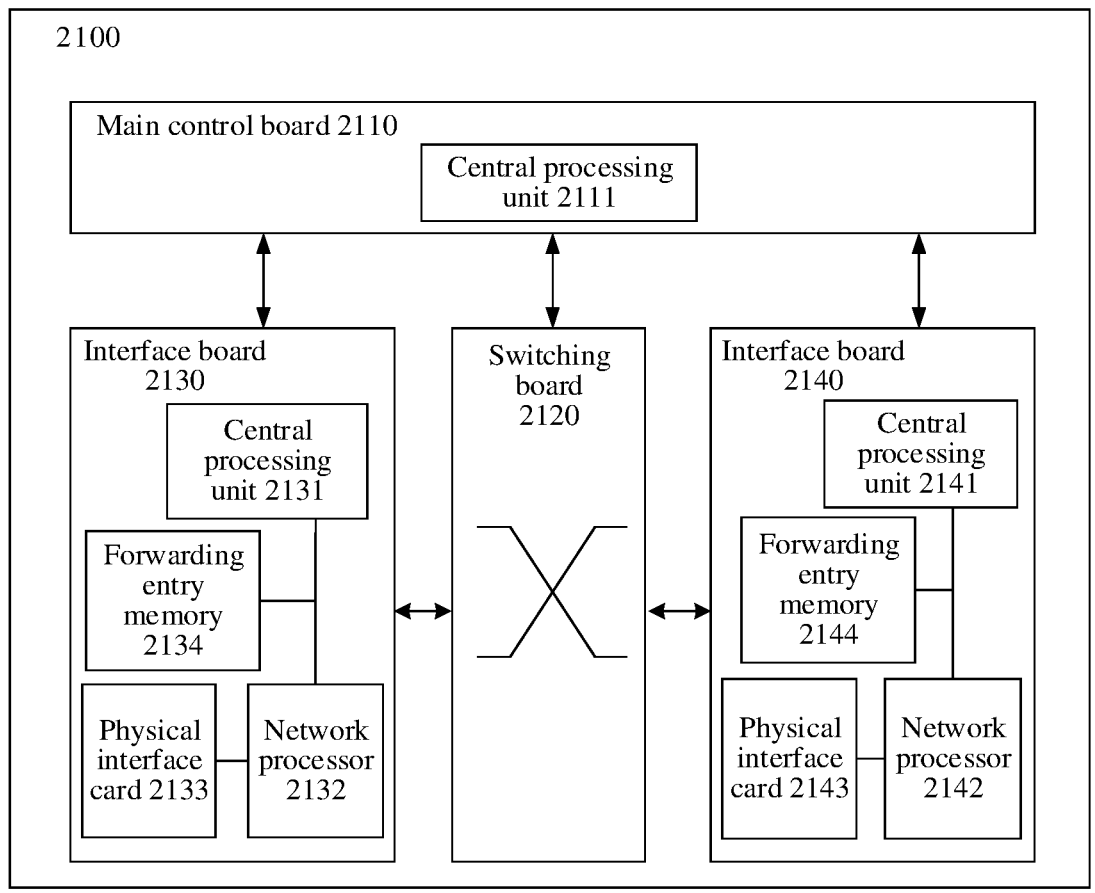
FIG. 7 is a schematic diagram of a hardware structure of another first root node device 2100 according to an embodiment of this application.

FIG. 7 is a schematic diagram of a hardware structure of another first root node device 2100 according to an embodiment of this application. The first root node device 2100 shown in FIG. 7 may perform corresponding steps performed by the first root node device in the methods of the foregoing embodiments.

As shown in FIG. 7, the first root node device 2100 includes a main control board 2110, an interface board 2130, a switching board 2120, and an interface board 2140. The main control board 2110, the interface board 2130, the interface board 2140, and the switching board 2120 are connected to a platform backboard through a system bus for interworking. The main control board 2110 is configured to complete functions such as system management, device maintenance, and protocol processing. The switching board 2120 is configured to exchange data between interface boards (where the interface board is also referred to as a line card or a service board). The interface boards 2130 and 2140 are configured to: provide various service interfaces (such as a POS interface, a GE interface, and an ATM interface), and forward a data packet.

The interface board 2130 may include a central processing unit 2131, a forwarding entry memory 2134, a physical interface card 2133, and a network processor 2132. The central processing unit 2131 is configured to: control and manage the interface board, and communicate with a central processing unit on the main control board. The forwarding entry memory 2134 is configured to store an entry. The physical interface card 2133 is configured to send and receive traffic.

It should be understood that an operation on the interface board 2140 is consistent with an operation on the interface board 2130 in this embodiment of this application. For brevity, details are not described again.

It should be understood that the first root node device 2100 in this embodiment may correspond to the functions and/or the various implemented steps in the method embodiments. Details are not described herein again.

In addition, it should be noted that, there may be one or more main control boards. When there are a plurality of main control boards, the main control boards may include an active main control board and a standby main control board. There may be one or more interface boards, and the first root node device with a stronger data processing capability provides more interface boards. There may also be one or more physical interface cards on the interface board. There may be no switching board or one or more switching boards. When there are a plurality of switching boards, load balancing and redundancy backup may be implemented together. In a centralized forwarding architecture, the first root node device may not need a switching board, and the interface board is responsible for a service data processing function of an entire system. In a distributed forwarding architecture, the first root node device may have at least one switching board, and data exchange between a plurality of interface boards is implemented via the switching board, to provide a large-capacity data exchange and processing capability. Therefore, a data access and processing capability of the first root node device in the distributed architecture is better than that of a device in the centralized architecture. A specific architecture that is to be used depends on a specific networking deployment scenario. This is not limited herein.

Figure 8:
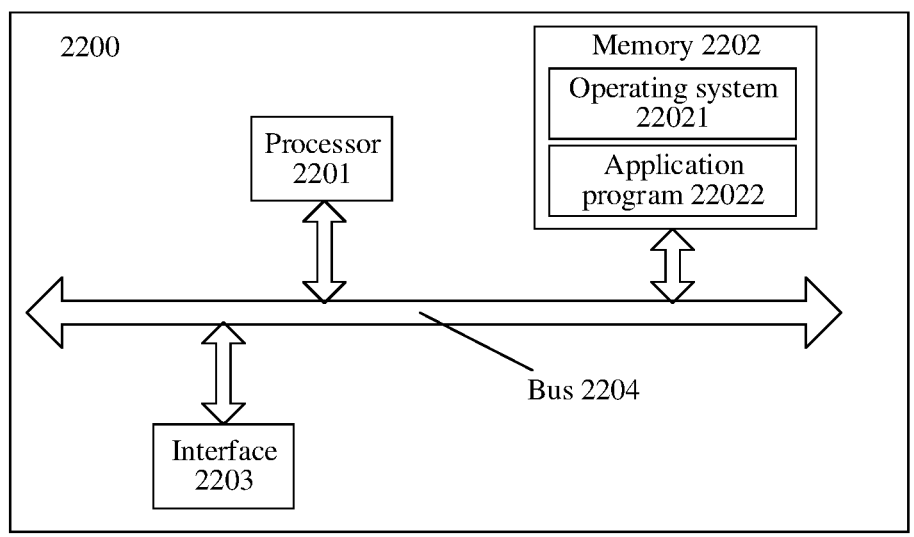
FIG. 8 is a schematic diagram of a hardware structure of a leaf node device 2200 according to an embodiment of this application.

FIG. 8 is a schematic diagram of a hardware structure of a leaf node device 2200 according to an embodiment of this application. The leaf node device 2200 shown in FIG. 8 may perform corresponding steps performed by the leaf node device in the methods of the foregoing embodiments.

As shown in FIG. 8, the leaf node device 2200 includes a processor 2201, a memory 2202, an interface 2203, and a bus 2204. The interface 2203 may be implemented in a wireless or wired manner, and may be specifically a network adapter. The processor 2201, the memory 2202, and the interface 2203 are connected through the bus 2204.

The interface 2203 may specifically include a transmitter and a receiver, configured to: send a message to the first root node device; and receive the multicast traffic sent by the first root node device. The processor 2201 is configured to perform processing that is performed by the leaf node device in the foregoing embodiment. For example, the processor 2201 is configured to generate a message, and/or configured to perform another process of the technology described in this specification. The memory 2202 includes an operating system 22021 and an application 22022, and is configured to store programs, a code, or instructions. When executing the programs, the code, or the instructions, the processor or a hardware device may complete the processing processes of the leaf node device in the method embodiments. Optionally, the memory 2202 may include a read-only memory (ROM) and a random access memory (RAM). The ROM includes a basic input/output system (BIOS) or an embedded system, and the RAM includes an application program and an operating system. When the leaf node device 2200 needs to be run, a BIOS built into the ROM or a bootloader in an embedded system is used to boot a system to start, and boot the leaf node device 2200 to enter a normal operating status. After entering the normal operating status, the leaf node device 2200 runs the application program and the operating system in the RAM, so as to complete the processing processes of the leaf node device 2200 in the method embodiments.

It may be understood that FIG. 8 shows only a simplified design of the leaf node device 2200. In an actual application, the leaf node device may include any quantity of interfaces, processors, or memories.

Figure 9:
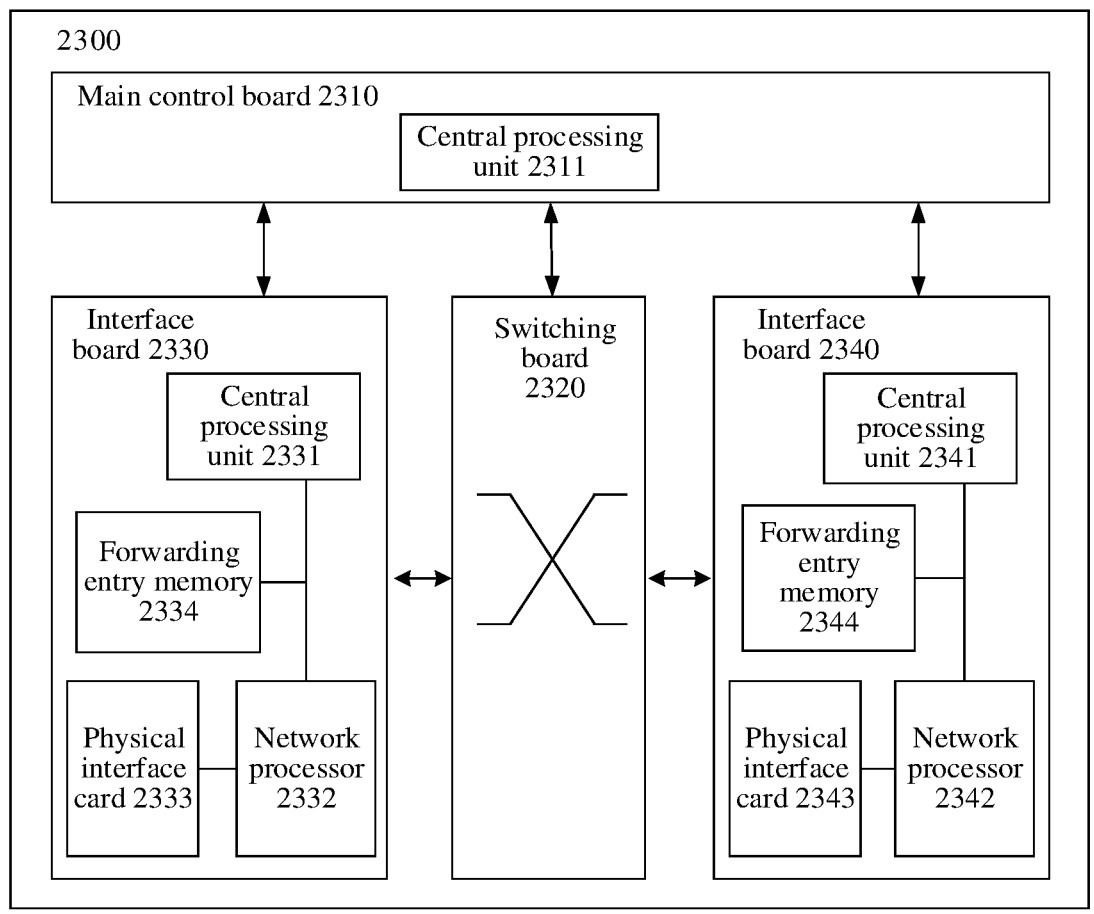
FIG. 9 is a schematic diagram of a hardware structure of another leaf node device 2300 according to an embodiment of this application.

FIG. 9 is a schematic diagram of a hardware structure of another leaf node device 2300 according to an embodiment of this application. The leaf node device 2300 shown in FIG. 9 may perform corresponding steps performed by the leaf node device in the methods of the foregoing embodiments.

As shown in FIG. 9, the leaf node device 2300 includes a main control board 2310, an interface board 2330, a switching board 2320, and an interface board 2340. The main control board 2310, the interface boards 2330 and 2340, and the switching board 2320 are connected to a system backboard through a system bus for interworking.

The main control board 2310 is configured to complete functions such as system management, device maintenance, and protocol processing. The switching board 2320 is configured to exchange data between interface boards (the interface board is also referred to as a line card or a service board). The interface boards 2330 and 2340 are configured to provide various service interfaces (for example, a POS interface, a GE interface, and an ATM interface), and forward a data packet.

The interface board 2330 may include a central processing unit 2331, a forwarding entry memory 2334, a physical interface card 2333, and a network processor 2332. The central processing unit 2331 is configured to control and manage the interface board, and communicate with a central processing unit on the main control board. The forwarding entry memory 2334 is configured to store an entry. The physical interface card 2133 is configured to send and receive traffic.

It should be understood that an operation on the interface board 2340 is consistent with an operation on the interface board 2330 in this embodiment of this application. For brevity, details are not described. It should be understood that the leaf node device 2300 in this embodiment may correspond to the functions and/or the various implemented steps in the method embodiments. Details are not described herein again.

In addition, it should be noted that, there may be one or more main control boards. When there are a plurality of main control boards, the main control boards may include an active main control board and a standby main control board. There may be one or more interface boards, and the leaf node device with a stronger data processing capability provides more interface boards. There may also be one or more physical interface cards on the interface board. There may be no switching board or one or more switching boards. When there are a plurality of switching boards, load balancing and redundancy backup may be implemented together. In a centralized forwarding architecture, the leaf node device may not need a switching board, and the interface board is responsible for a service data processing function of an entire system. In a distributed forwarding architecture, the leaf node device may have at least one switching board, and data exchange between a plurality of interface boards is implemented via the switching board, to provide a large-capacity data exchange and processing capability. Therefore, a data access and processing capability of the leaf node device in the distributed architecture is better than that of a device in the centralized architecture. A specific architecture that is to be used depends on a specific networking deployment scenario. This is not limited herein.

Embodiments of this application further provide a computer-readable medium. The computer-readable medium stores a program code. When the computer program code is executable on a computer, the computer is enabled to perform the method performed by the first root node device. The computer-readable storage includes but is not limited to one or more of the following: a read-only memory (ROM), a programmable ROM (PROM), an erasable PROM (EPROM), a Flash memory, an electrically EPROM (EEPROM), and a hard drive.

Embodiments of this application further provide a computer-readable medium. The computer-readable medium stores a program code. When the computer program code is executable on a computer, the computer is enabled to perform the method performed by the leaf node device. The computer-readable storage includes but is not limited to one or more of the following: a read-only memory (ROM), a programmable ROM (PROM), an erasable PROM (EPROM), a Flash memory, an electrically EPROM (EEPROM), and a hard drive.

Embodiments of this application further provide a chip system applied to a first root node device. The chip system includes at least one processor, at least one memory, and an interface circuit. The interface circuit is responsible for information exchange between the chip system and the outside. The at least one memory, the interface circuit, and the at least one processor are interconnected through a line. The at least one memory stores instructions, and the instructions are executed by the at least one processor, to perform operations of the first root node device in the methods in the foregoing aspects.

In a specific implementation process, the chip may be implemented in a form of a central processing unit (CPU), a micro controller unit (MCU), a micro processing unit (MPU), a digital signal processor (DSP), a system on chip (SoC), an application-specific integrated circuit (ASIC), a field programmable gate array (FPGA), or a programmable logic device (PLD).

Embodiments of this application further provide a chip system applied to a leaf node device. The chip system includes at least one processor, at least one memory, and an interface circuit. The interface circuit is responsible for information exchange between the chip system and the outside. The at least one memory, the interface circuit, and the at least one processor are interconnected through a line. The at least one memory stores instructions, and the instructions are executed by the at least one processor, to perform operations of the leaf node device in the methods in the foregoing aspects.

In a specific implementation process, the chip may be implemented in a form of a central processing unit (CPU), a micro controller unit (MCU), a micro processing unit (MPU), a digital signal processor (DSP), a system on chip (SoC), an application-specific integrated circuit (ASIC), a field programmable gate array (FPGA), or a programmable logic device (PLD).

Embodiments of this application further provide a computer program product applied to a first root node device. The computer program product includes a series of instructions, and when the instructions are executed, operations of the first root node device in the methods in the foregoing aspects are performed.

Embodiments of this application further provide a computer program product applied to a leaf node device. The computer program product includes a series of instructions, and when the instructions are executed, operations of the leaf node device in the methods in the foregoing aspects are performed.

A person of ordinary skill in the art may be aware that, with reference to the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatuses, and method may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions in the embodiments.

In addition, functional units in the embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to a conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, for example, a USB flash drive, a removable hard disk, a read-only memory (ROM), a random access memory (RAM), a magnetic disk, or an optical disc.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A load sharing method, comprising:
   receiving, by a first root node device, a message sent by a leaf node device, the message comprising a first identifier and configuration information, the first identifier indicating the leaf node device, the configuration information indicating a configuration mode requested by the leaf node device for load sharing from a root node device group to the leaf node device, and the root node device group comprising the first root node device; and
   determining, by the first root node device, a configuration result of the load sharing from the first root node device to the leaf node device by at least performing a hash calculation based on the first identifier and the configuration information from the message sent by the leaf node, wherein the first root node device determines whether it is a primary root or a secondary root based on the configuration result.

2. The method according to claim 1, wherein the primary root indicates that the first root node device is a designated forwarder (DF) that forwards multicast traffic to the leaf node device.

3. The method according to claim 1, wherein the secondary root indicates that the first root node device is a non-designated forwarder (non-DF) that forwards multicast traffic to the leaf node device.

4. The method according to claim 1, wherein the configuration information comprises third indication information, and the third indication information indicates information about a candidate root node device serving as the primary root of the leaf node device.

5. The method according to claim 4, wherein the message further comprises a multicast source group, and the candidate root node device comprises the first root node device; and the determining the configuration result comprises:
   performing, by the first root node device, the hash calculation on the multicast source group, the first identifier, and the configuration information, to obtain the configuration result.

6. The method according to claim 1, wherein the method further comprises:
   receiving, by the first root node device, multicast traffic; and
   sending, by the first root node device, the multicast traffic to the leaf node device in response to the first root node device being the primary root of the leaf node device.

7. A first root node device, comprising:
   at least one non-transitory memory storing instructions; and
   at least one processor in communication with the at least one memory, the instructions when executed in the at least one processor is configured to:
   receive a message sent by a leaf node device, the message comprising a first identifier and configuration information, the first identifier indicating the leaf node device, the configuration information indicating a configuration mode requested by the leaf node device for load sharing from a root node device group to the leaf node device, and the root node device group comprising the first root node device; and
   determine a configuration result of the load sharing from the first root node device to the leaf node device by at least performing a hash calculation based on the first identifier and the configuration information from the message sent by the leaf node device, wherein the first root node device determines whether it is a primary root or a secondary root based on the configuration result.

8. The first root node device according to claim 7, wherein the configuration information comprises first indication information, and the first indication information indicates that the first root node device is the primary root of the leaf node device, and wherein the primary root indicates that the first root node device is a designated forwarder (DF) that forwards multicast traffic to the leaf node device.

9. The first root node device according to claim 7, wherein the configuration information comprises second indication information, and the second indication information indicates that the first root node device is the secondary root of the leaf node device, and wherein the secondary root indicates that the first root node device is a non-designated forwarder (non-DF) that forwards multicast traffic to the leaf node device.

10. The first root node device according to claim 7, wherein the configuration information comprises third indication information, and the third indication information indicates information about a candidate root node device serving as the primary root of the leaf node device.

11. The first root node device according to claim 10, wherein the message further comprises a multicast source group, the candidate root node device comprises the first root node device, and the at least one processor is coupled to the at least one memory to execute the instructions to:
perform the hash calculation on the multicast source group, the first identifier, and the configuration information, to obtain the configuration result.

12. The first root node device according to claim 7, wherein the instructions when executed in the at least one processor is further configured to
receive multicast traffic; and
send the multicast traffic to the leaf node device in response to the first root node device being the primary root of the leaf node device.

13. A leaf node device, comprising:
at least one memory storing instructions; and
at least one processor in communication with the at least one memory, the instructions when executed in the at least one processor are configured to:
generate a message, wherein the message comprises a first identifier and configuration information, the first identifier indicates the leaf node device, and the configuration information indicates a configuration mode requested by the leaf node device for load sharing from a root node device group to the leaf node device, wherein a configuration result determined by performing a hash calculation of the first identifier and the configuration information indicates whether a first root node device is a primary root or a secondary root of the leaf node device; and
send the message to the first root node device, wherein the root node device group comprises the first root node device.

14. The leaf node device according to claim 13, wherein the configuration information comprises first indication information, the first indication information indicates that the first root node device is the primary root of the leaf node device, and the primary root indicates that the first root node device is a designated forwarder (DF) that forwards multicast traffic to the leaf node device.

15. The leaf node device according to claim 14, wherein the configuration information comprises third indication information, and the third indication information indicates information about a candidate root node device serving as the primary root of the leaf node device.

16. The leaf node device according to claim 13, wherein the configuration information comprises second indication information, the second indication information indicates that the first root node device is the secondary root of the leaf node device, and the secondary root indicates that the first root node device is a non-designated forwarder (non-DF) that forwards multicast traffic to the leaf node device.

17. The leaf node device according to claim 13, wherein the first root node device is the primary root of the leaf node device, and the instructions are further configured to:
receive multicast traffic sent by the first root node device.

* * * * *